United States Patent
Alanqar et al.

(10) Patent No.: US 12,523,976 B2
(45) Date of Patent: Jan. 13, 2026

(54) SYSTEMS AND METHODS FOR COMBINED OUTDOOR AIR FRACTION AND VAV UNIT CONTROL

(71) Applicant: Johnson Controls Tyco IP Holdings LLP, Milwaukee, WI (US)

(72) Inventors: Anas W. I. Alanqar, Milwaukee, WI (US); Michael J. Wenzel, Grafton, WI (US); Jon Douglas, Mequon, WI (US); Fang Du, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 401 days.

(21) Appl. No.: 17/955,699

(22) Filed: Sep. 29, 2022

(65) Prior Publication Data

US 2024/0118670 A1 Apr. 11, 2024

(51) Int. Cl.
*F24F 11/00* (2018.01)
*G05B 19/042* (2006.01)
(Continued)

(52) U.S. Cl.
CPC ........ *G05B 19/042* (2013.01); *F24F 11/0001* (2013.01); *F24F 2110/70* (2018.01); *F24F 2140/40* (2018.01); *G05B 2219/2614* (2013.01)

(58) Field of Classification Search
CPC ........... G05B 19/042; G05B 2219/2614; F24F 11/0001; F24F 2110/70; F24F 2140/40
See application file for complete search history.

(56) References Cited

U.S. PATENT DOCUMENTS

| 4,570,448 A | * | 2/1986 | Smith ................. F24F 11/74 165/251 |
| 9,447,985 B2 | | 9/2016 | Johnson |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Afram et al., "Theory and Application of HVAC Control Systems—A review of Model Predictive Control (MPC)," Building and Environment, Feb. 2014, vol. 72 (pp. 343-355).

(Continued)

*Primary Examiner* — Michael W Choi
(74) *Attorney, Agent, or Firm* — Foley & Lardner LLP

(57) ABSTRACT

An control method includes obtaining measurements of a carbon dioxide (CO2) level of a zone and a temperature of the zone. The method includes determining, based on the CO2 level of the zone and the temperature of the zone, a combination if (i) control decisions for an air handling unit (AHU) and (ii) control decisions for a damper of a variable air volume (VAV) unit to satisfy both a ventilation control objective and a temperature control objective. The control decisions for the AHU include adjustments to a fresh air intake fraction of the AHU between multiple values over time, and the control decisions for the VAV unit include adjustments to a position of a damper of the VAV unit over time. The method includes operating the AHU according to the control decisions for the AHU and operate the VAV unit according to the control decisions for the VAV unit.

20 Claims, 14 Drawing Sheets

(51) Int. Cl.
    *F24F 110/70*        (2018.01)
    *F24F 140/40*        (2018.01)

(56)            References Cited

U.S. PATENT DOCUMENTS

| | | | |
|---|---|---|---|
| 10,871,756 | B2 | 12/2020 | Johnson et al. |
| 10,908,578 | B2 | 2/2021 | Johnson et al. |
| 10,921,768 | B2 | 2/2021 | Johnson et al. |
| 11,156,978 | B2 | 10/2021 | Johnson et al. |
| 2003/0055798 | A1 | 3/2003 | Hittle et al. |
| 2012/0232702 | A1* | 9/2012 | Vass .................. G05D 23/1934 700/277 |
| 2018/0017276 | A1* | 1/2018 | Thomle .................... F24F 11/30 |
| 2018/0231994 | A1* | 8/2018 | Leeland ............. G05D 23/1905 |
| 2021/0215378 | A1* | 7/2021 | Salsbury ............ G05B 13/0225 |
| 2022/0203287 | A1 | 6/2022 | Wenger et al. |
| 2022/0203288 | A1 | 6/2022 | Wenger et al. |
| 2022/0205962 | A1 | 6/2022 | Vanderkoy |
| 2022/0207215 | A1 | 6/2022 | Liu et al. |
| 2022/0221184 | A1 | 7/2022 | Gupta et al. |
| 2022/0228756 | A1 | 7/2022 | Gupta et al. |
| 2022/0254483 | A1 | 8/2022 | Boisvert et al. |
| 2022/0277851 | A1 | 9/2022 | Wellig |
| 2022/0282886 | A1 | 9/2022 | Hriljac et al. |
| 2022/0293261 | A1 | 9/2022 | Mcbrady et al. |
| 2022/0305438 | A1 | 9/2022 | Wenger et al. |
| 2022/0305881 | A1 | 9/2022 | Neu et al. |

FOREIGN PATENT DOCUMENTS

| | | |
|---|---|---|
| EP | 1 156 286 A2 | 11/2001 |
| EP | 3 186 687 | 7/2017 |
| EP | 3 497 377 | 6/2019 |
| WO | WO-2012/161804 A1 | 11/2012 |
| WO | WO-2013/130956 A1 | 9/2013 |

OTHER PUBLICATIONS

Ahn et al., "Optimal Control Development for Chilled Water Plants Using a Quadratic Representation," Energy and Buildings, Apr. 2001, vol. 33, No. 4 (pp. 371-378).
Alvarado et al., "A Methodology to Monitor Airborne PM10 Dust Particles Using a Small Unmanned Aerial Vehicle," Sensors, 2017, vol. 17 (25 pages).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 4, 2023 (4 pages).
EPO Office Action on EP Appl. Ser. No. 16165681.4 dated Apr. 6, 2021 (7 pages).
EPO Search Opinion EP Appl. Ser. No. EP 22177772.5 dated Sep. 26, 2022 (6 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review, 2013 IEEE International Conference on Automation Science and Engineering, Model Predictive Control for HVAC Systems—A Review," 2013 IEEE International Conference on Automation Science and Engineering (CASE), Madison, WI, United States, Aug. 17-20, 2013 (pp. 442-447).
Mckenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of Hva C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildinqs," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).

(56) References Cited

OTHER PUBLICATIONS

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition—Coordination Method," Energy and Buildings, May 2010, vol. 42, No. 5 (pp. 570-583).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

SYSTEMS AND METHODS FOR COMBINED OUTDOOR AIR FRACTION AND VAV UNIT CONTROL

BACKGROUND

The present disclosure relates generally to HVAC systems for a building and more particularly to airside economizers in a building HVAC system. Economizers are a type of air handling unit (AHU) in a building HVAC system that provide ventilation to a building space. Economizers are capable of both recirculating air from the building space and introducing outside air into the building space by varying an amount of outside air permitted to pass through the economizer.

SUMMARY

One implementation of the present disclosure is a ventilation and temperature control system a building, according to some embodiments. In some embodiments, the system includes an air handling unit (AHU) configured to draw air from outside the building according to a fresh air intake fraction and recirculated air from a zone of the building. In some embodiments, the system include a variable air volume (VAV) unit configured to supply air to the zone of the building using air provided by the AHU. In some embodiments, the system includes processing circuitry configured to obtain measurements of at least one of a carbon dioxide ($CO_2$) level or occupancy of the zone and a temperature of the zone. In some embodiments, the processing circuitry is configured to determine, based on the $CO_2$ level of the zone and the temperature of the zone, a combination of (i) control decisions for the AHU and (ii) control decisions for a damper of the VAV unit to satisfy both a ventilation control objective and a temperature control objective. In some embodiments, the control decisions for the AHU include adjustments to the fresh air intake fraction between multiple values over time, and the control decisions for the VAV unit include adjustments to a position of a damper of the VAV unit over time. In some embodiments, the processing circuitry is configured to operate the AHU according to the control decisions for the AHU and operate the VAV unit according to the control decisions for the VAV unit.

In some embodiments, the ventilation and temperature control system serves multiple zones. In some embodiments, the processing circuitry is configured to determine the control decisions for the AHU and the control decisions for multiple dampers of the VAV unit to maintain the $CO_2$ levels of the zones below a $CO_2$ threshold and to maintain the temperatures of the zones within a range of a desired temperature as the ventilation control objective and the temperature control objective.

In some embodiments, the control decisions for the AHU include a schedule for transitioning the fresh air intake fraction of the AHU between multiple discrete values. In some embodiments, the control decisions for the damper of the VAV unit are determined by the processing circuitry based on the schedule for transitioning the fresh air intake fraction of the AHU across a future time horizon, the measurement of the $CO_2$ level in the zone, and a threshold $CO_2$ level in the zone. In some embodiments, the control decisions for the damper of the VAV unit determined by the processing circuitry such that the control decisions for the damper of the VAV unit maintain the $CO_2$ level in the zone below the threshold $CO_2$ level.

In some embodiments, the control decisions for the damper of the VAV unit are determined using a predictive model of $CO_2$ of the zone, the predictive model configured to predict the $CO_2$ level of the zone as a function of the control decisions for the AHU and the control decisions for the VAV unit. In some embodiments, determining, based on the $CO_2$ level of the zone and the temperature of the zone, control decisions for the AHU and control decisions for a damper of the VAV unit includes determining a $CO_2$ error based on the $CO_2$ level of the zone and a threshold $CO_2$ and a temperature error based on the temperature of the zone and a desired temperature. IN some embodiments, determining the control decisions for the AHU and control decisions for the damper of the VAV unit includes performing feedback control using the $CO_2$ error and the temperature error to determine parameters for a first sinusoid function and a second sinusoid function. In some embodiments, determining the control decisions for the AHU and the VAV unit includes generating control decisions for the AHU according to outputs of the first sinusoid function, and generating control decisions for the damper of the VAV unit according to outputs of the second sinusoid function. In some embodiments, the second sinusoid function includes a phase shift relative to the first sinusoid function.

Another implementation of the present disclosure is a controller for a ventilation and temperature control system of a building, according to some embodiments. In some embodiments, the controller includes processing circuitry configured to obtain measurements of at least one of a carbon dioxide ($CO_2$) level or occupancy of a zone and a temperature of the zone. In some embodiments, the processing circuitry is configured to determine, based on the $CO_2$ level of the zone and the temperature of the zone, a combination of (i) control decisions for an air handling unit (AHU) and (ii) control decisions for a damper of a variable air volume (VAV) unit to satisfy both a ventilation control objective and a temperature control objective. In some embodiments, the control decisions for the AHU including adjustments to a fresh air intake fraction of the AHU between multiple values over time, and the control decisions for the VAV unit including adjustments to a position of a damper of the VAV unit over time. In some embodiments, the processing circuitry is configured to operate the AHU according to the control decisions for the AHU and operate the VAV unit according to the control decisions for the VAV unit. In some embodiments, the AHU draws outdoor air and recirculated air according to the fresh air intake fraction and delivers air to the VAV unit through a duct.

In some embodiments, the ventilation and temperature control system serves multiple zones. In some embodiments, the processing circuitry is configured to determine the control decisions for the AHU and the control decisions for multiple dampers of the VAV unit to maintain the $CO_2$ levels of the zones below a $CO_2$ threshold and to maintain the temperatures of the zones within a range of a desired temperature as the ventilation control objective and the temperature control objective.

In some embodiments, the control decisions for the AHU include a schedule for transitioning the fresh air intake fraction of the AHU between multiple discrete values. In some embodiments, the control decisions for the damper of the VAV unit are determined by the processing circuitry based on the schedule for transitioning the fresh air intake fraction of the AHU across a future time horizon, the measurement of the $CO_2$ level in the zone, and a threshold $CO_2$ level in the zone. In some embodiments, the control decisions for the damper of the VAV unit determined by the processing circuitry such that the control decisions for the damper of the VAV unit maintain the CO2 level in the zone below the threshold CO2 level.

In some embodiments, the control decisions for the damper of the VAV unit are determined using a predictive model of CO2 of the zone. In some embodiments, the predictive model is configured to predict the CO2 level of the zone as a function of the control decisions for the AHU and the control decisions for the VAV unit.

In some embodiments, determining, based on the CO2 level of the zone and the temperature of the zone, control decisions for the AHU and control decisions for a damper of the VAV unit includes determining a CO2 error based on the CO2 level of the zone and a threshold CO2 and a temperature error based on the temperature of the zone and a desired temperature. In some embodiments, determining the control decisions for the AHU and the control decisions for the damper of the VAV unit further includes performing feedback control using the CO2 error and the temperature error to determine parameters for a first sinusoid function and a second sinusoid function. In some embodiments, determining the control decisions for the AHU and the control decisions for the damper of the VAV unit further includes generating control decisions for the AHU according to outputs of the first sinusoid function, and generating control decisions for the damper of the VAV unit according to outputs of the second sinusoid function. In some embodiments, the second sinusoid function includes a phase shift relative to the first sinusoid function.

Another implementation of the present disclosure is a method for controlling a ventilation and temperature control system of a building, according to some embodiments. In some embodiments, the method includes obtaining measurements of at least one of a carbon dioxide (CO2) level or occupancy of a zone and a temperature of the zone. In some embodiments, the method further includes determining, based on the CO2 level of the zone and the temperature of the zone, a combination if (i) control decisions for an air handling unit (AHU) and (ii) control decisions for a damper of a variable air volume (VAV) unit to satisfy both a ventilation control objective and a temperature control objective. In some embodiments, the control decisions for the AHU comprising adjustments to a fresh air intake fraction of the AHU between multiple values over time, and the control decisions for the VAV unit comprising adjustments to a position of a damper of the VAV unit over time. In some embodiments, the method includes operating the AHU according to the control decisions for the AHU and operate the VAV unit according to the control decisions for the VAV unit. In some embodiments, the AHU draws outdoor air and recirculated air according to the fresh air intake fraction and delivers air to the VAV unit through a duct.

In some embodiments, the ventilation and temperature control system serves multiple zones. In some embodiments, method includes determining the control decisions for the AHU and the control decisions for dampers of the VAV unit to maintain the CO2 levels of the zones below a CO2 threshold and to maintain the temperatures of the zones within a range of a desired temperature as the ventilation control objective and the temperature control objective.

In some embodiments, the control decisions for the AHU include a schedule for transitioning the fresh air intake fraction of the AHU between multiple discrete values. In some embodiments, the control decisions for the damper of the VAV unit are determined based on the schedule for transitioning the fresh air intake fraction of the AHU across a future time horizon, the measurement of the CO2 level in the zone, and a threshold CO2 level in the zone. In some embodiments, the control decisions for the damper of the VAV unit determined such that the control decisions for the damper of the VAV unit maintain the CO2 level in the zone below the threshold CO2 level.

In some embodiments, the control decisions for the damper of the VAV unit are determined using a predictive model of CO2 of the zone. In some embodiments, the predictive model is configured to predict the CO2 level of the zone as a function of the control decisions for the AHU and the control decisions for the VAV unit.

In some embodiments, determining, based on the CO2 level of the zone and the temperature of the zone, control decisions for the AHU and control decisions for a damper of the VAV unit includes determining a CO2 error based on the CO2 level of the zone and a threshold CO2 and a temperature error based on the temperature of the zone and a desired temperature. In some embodiments, determining the control decisions for the AHU and the control decisions for the damper of the VAV unit includes performing feedback control using the CO2 error and the temperature error to determine parameters for a first sinusoid function and a second sinusoid function and generating control decisions for the AHU according to outputs of the first sinusoid function, and generating control decisions for the damper of the VAV unit according to outputs of the second sinusoid function. In some embodiments, the second sinusoid function includes a phase shift relative to the first sinusoid function.

DETAILED DESCRIPTION

Overview

Referring generally to the FIGURES, an AHU and VAV system is configured to provide air to one or more zones or rooms to provide heating or cooling, and to provide ventilation. A controller can determine different values for a damper of the AHU to affect a fresh air intake fraction over time. The controller can also determine controls for dampers of the VAV system (e.g., when to use air from the AHU, a position of the dampers, etc.) to provide air from the AHU to the zones in order to achieve both temperature control and air quality control (e.g., CO2 control). The controller can operate the damper of the AHU to adjust discretely between different values or continuously according to a sinusoid function. The controller can similarly operate the dampers of the VAV units according to a discrete or a sinusoid function.

Building HVAC Systems and Building Management Systems

Figure 1:
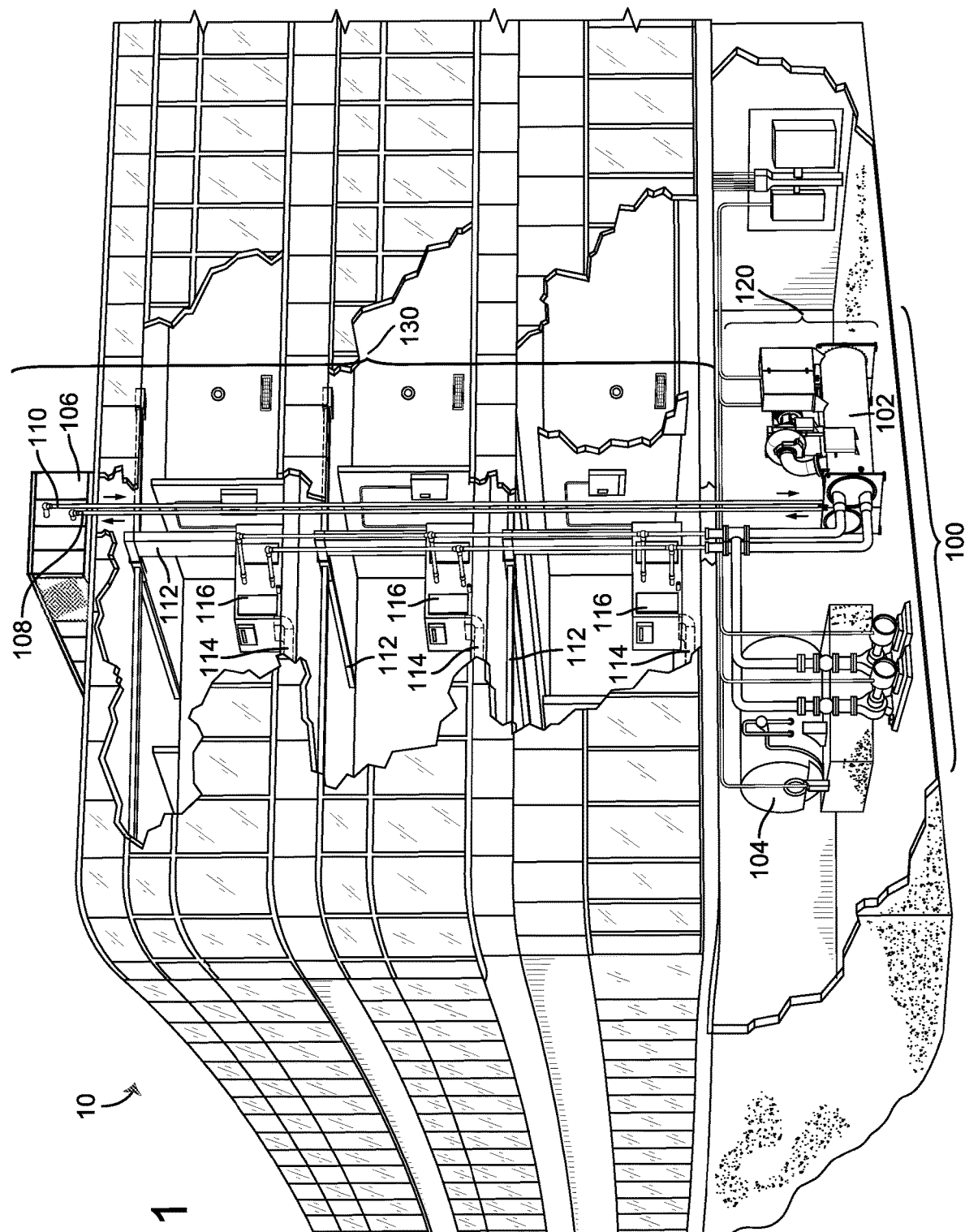
FIG. 1 is a drawing of a building equipped with a HVAC system, according to some embodiments.
Figure 2:
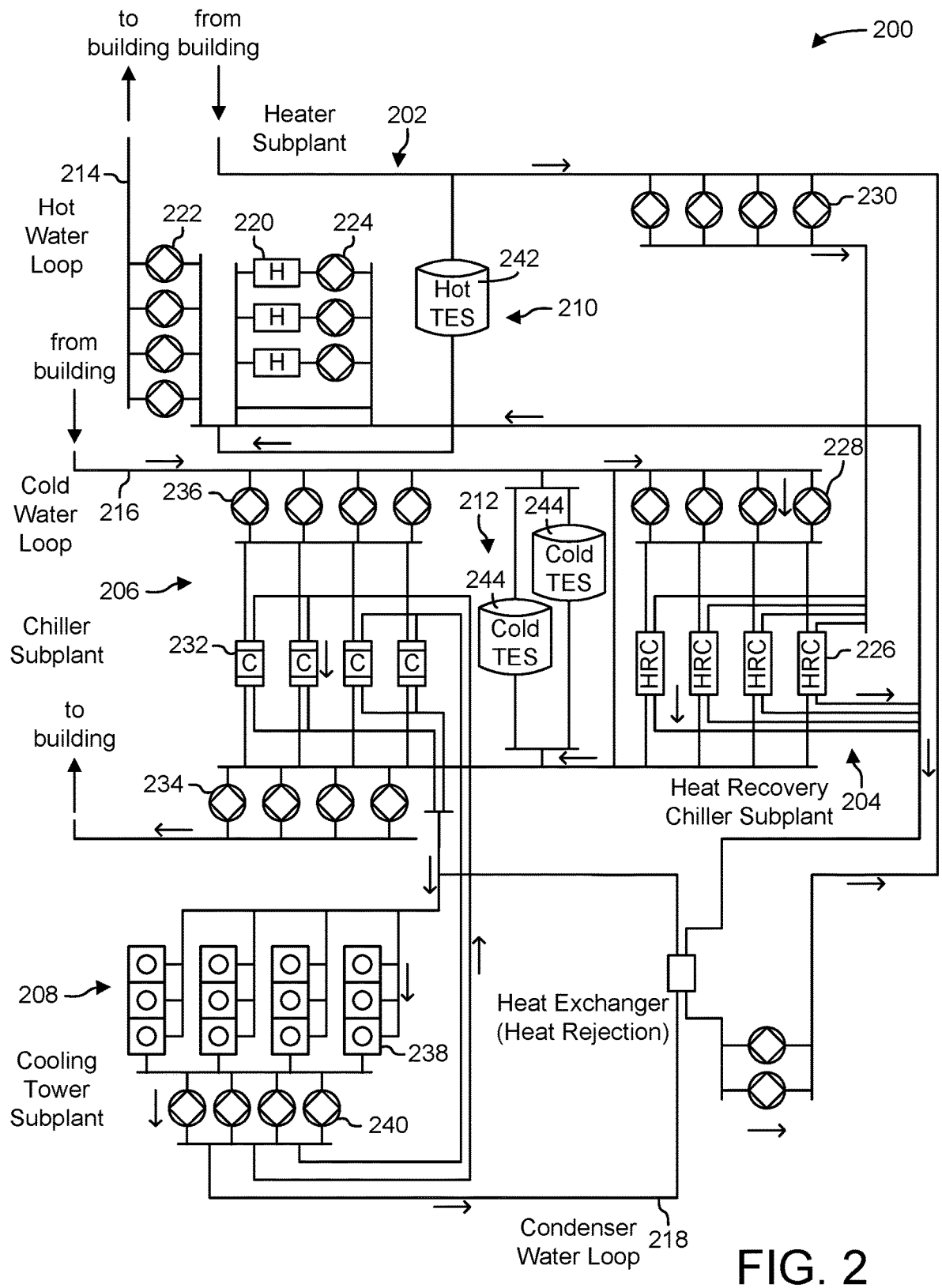
FIG. 2 is a schematic diagram of a waterside system which can be used in conjunction with the building of FIG. 1, according to some embodiments.
Figure 3:
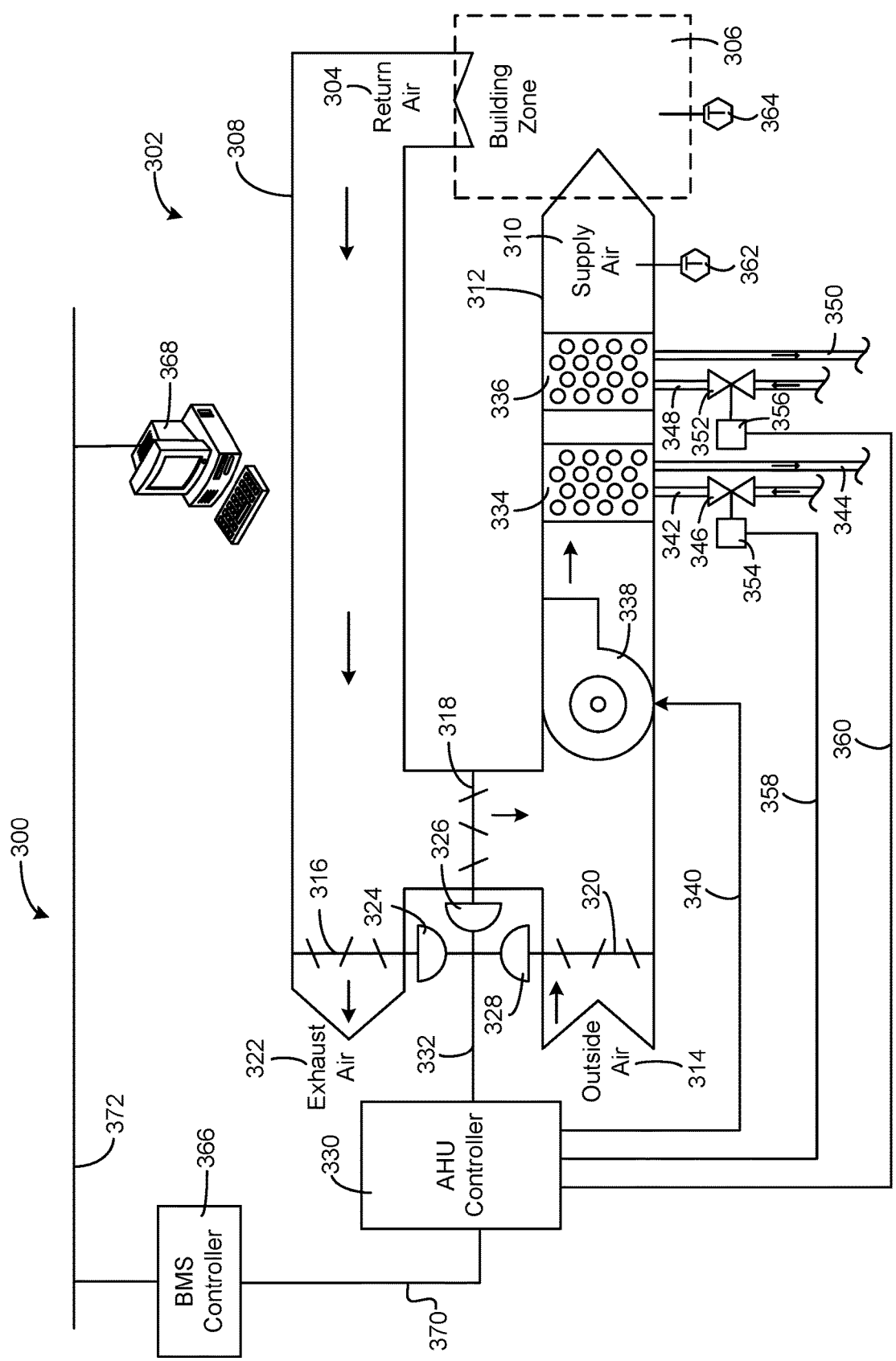
FIG. 3 is a schematic diagram of an airside system which can be used in conjunction with the building of FIG. 1, according to some embodiments.
Figure 4:
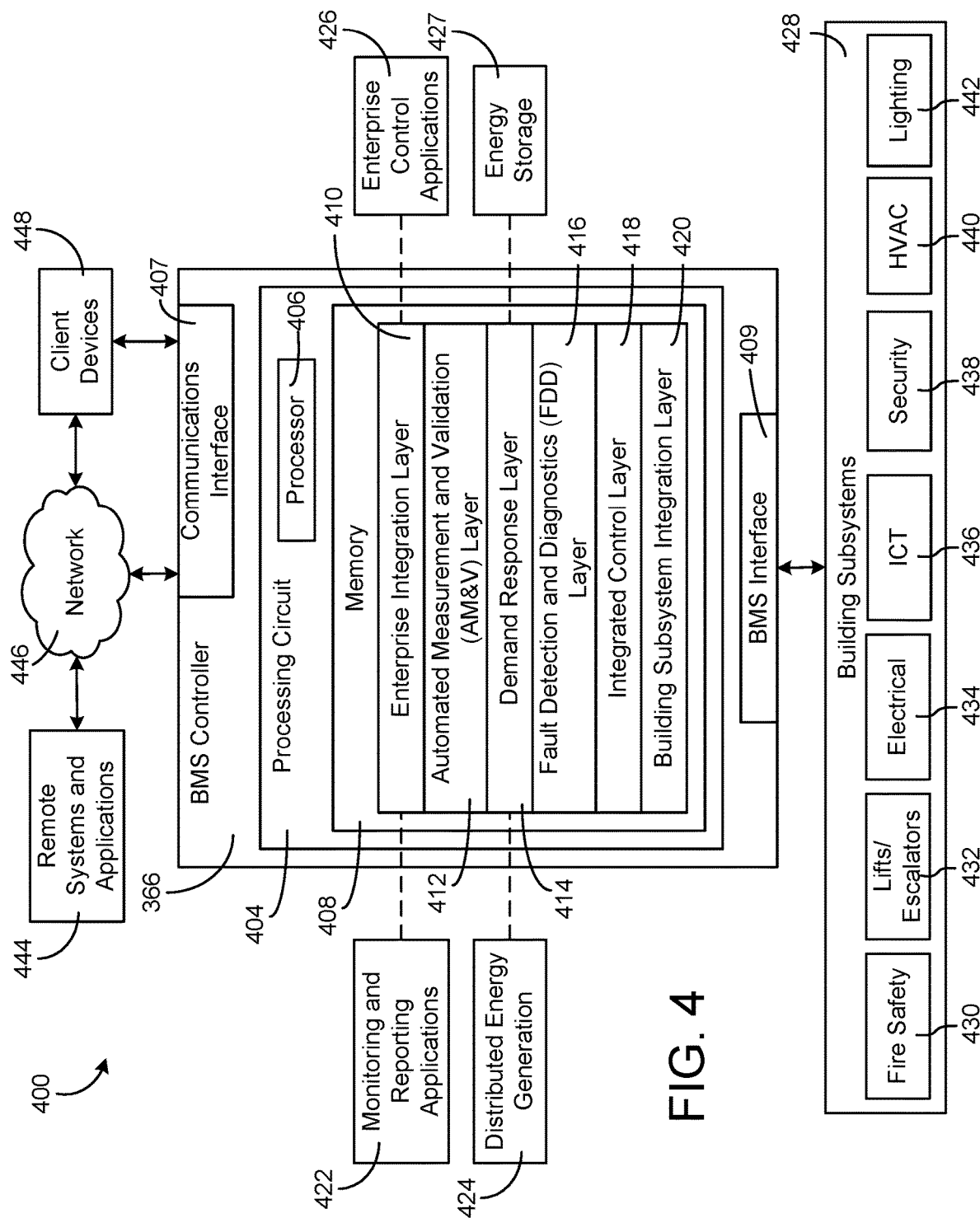
FIG. 4 is a block diagram of a building management system (BMS) which can be used to monitor and control the building of FIG. 1, according to some embodiments.
Figure 5:
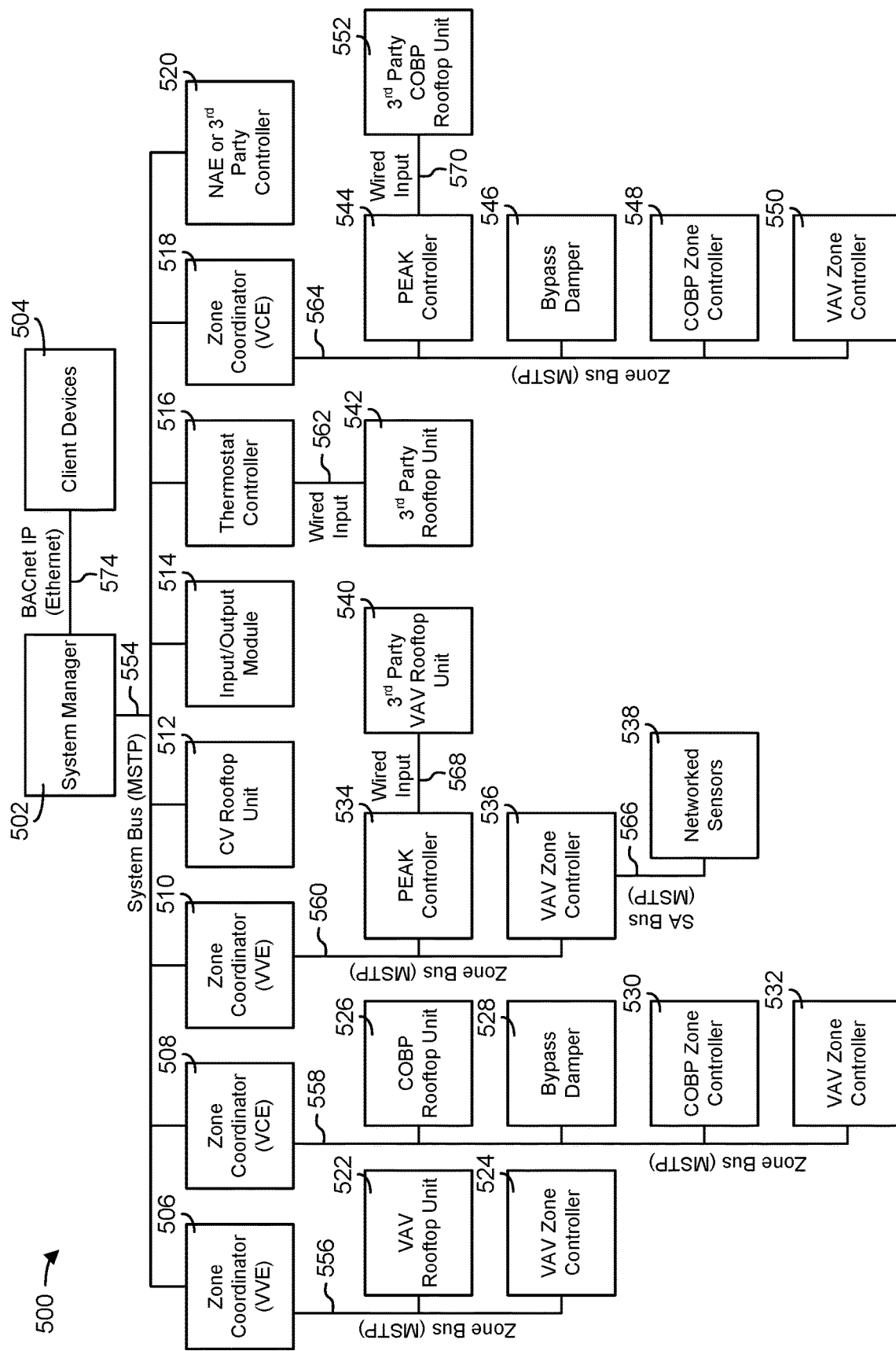
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314.

AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Variable Fresh Air Intake Operation

Figure 6:
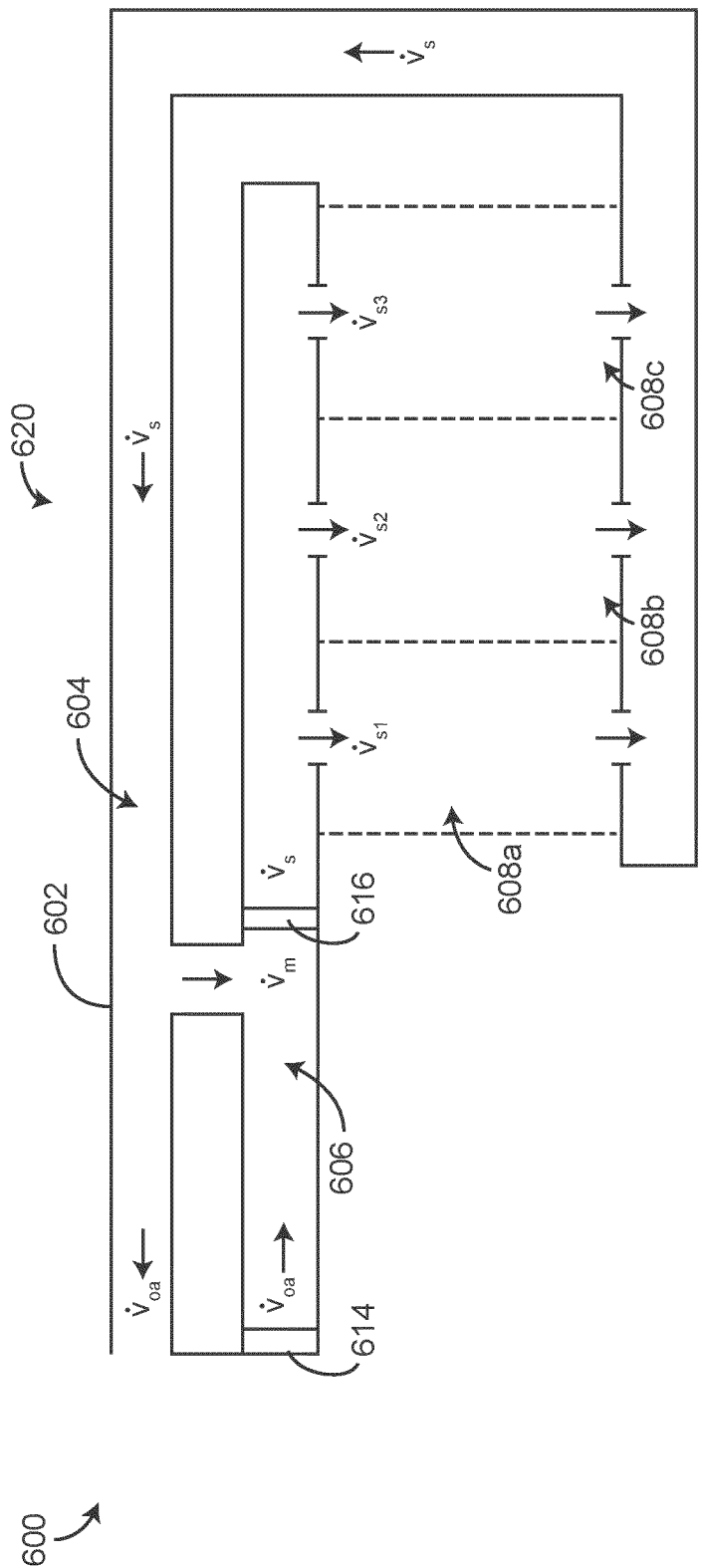
FIG. 6 is a block diagram of an air handling unit (AHU) and variable air volume (VAV) system, according to some embodiments.

Referring now to FIG. 6, a block diagram 600 illustrates a VAV unit 616 that services multiple spaces, shown as zones 608a, 608b, and 608c. Air is drawn from outdoor, shown as $\dot{v}_{oa}$, through damper 614 (e.g., a vent, an economizer, etc.) which mixes with a portion of return air, $\dot{v}_m$. Total air provided to the zones 608a, 608b, and 608c is $\dot{v}_s = \dot{v}_m + \dot{v}_{oa}$. The total air provided to the zones $\dot{v}_s$ may also be defined as a summation of air flow provided to each individual zones 608a, 608b, and 608c. In particular, $\dot{v}_s = \dot{v}_{s1} + \dot{v}_{s2} + \dot{v}_{s3}$, where $\dot{v}_{s1}$ is the airflow provided to zone 608a, $\dot{v}_{s2}$ is the airflow provided to zone 608b, and $\dot{v}_{s3}$ is the airflow provided to zone 608c. The air may pass through inner volume 606 of duct system 602 and be cooled to a desired temperature before entering the zones 608a, 608b, or 608c. The damper 614 controls both the amount of outdoor airflow $\dot{v}_{oa}$ and the recirculated air $\dot{v}_m$ (e.g., based on a fresh air intake fraction $x_{oa}$) to minimize energy consumption of a cooling coil of AHU 620 illustrated in FIG. 6.

If the temperature of the outdoor air is less than the desired temperature, the damper 614 may determine values for $\dot{v}_{oa}$ and $\dot{v}_m$ so that the mixture will be the desired temperature (e.g., $\dot{v}_s$). In such a case, the AHU 620 does not need to cool air, since the air when mixed will have the desired temperature, and cooling demands of the AHU 620 can be reduced. When the temperature of the outdoor air is greater than the desired temperature, and both the temperature of the outdoor air and the enthalpy of the outdoor air are less than the temperature and enthalpy, respectively, of air recirculated from the zones 608a, 608b, and 608c, the damper 614 may default to maximum ventilation (e.g., $\dot{v}_s = \dot{v}_{oa}$, and $\dot{v}_m = 0$), since the outdoor air is colder than the air returned from the zones 608a, 608b, or 608c. When either temperature of the outdoor air, or enthalpy of the outdoor air are greater than the temperature or enthalpy of the air recirculated from the zones 608a, 608b, and 608c, the damper 614 may default to minimum ventilation since the air returned from the zones 608a, 608b, or 608c is colder. In some embodiments, the damper 614 is configured to transition into a minimum ventilation state with a minimal percentage or a lowest percentage (e.g., a lowest outdoor air intake fraction $x = x_{min}$) such as 20% so that $\dot{v}_{oa} = 0.2 \dot{v}_s$ and $\dot{v}_m = 0.8 \dot{v}_s$. In some embodiments, the lowest outdoor air intake fraction is 0%, or a value that is significantly reduced relative to a higher setting.

In some embodiments, dynamics of the multiple zones (e.g., the zones 608a, 608b, and 608c) may be modeled similarly to single zone dynamics. Multi-zone temperature dynamics can be modeled as shown below:

$$V_e \frac{dT_e}{dt} \approx 0 = -\dot{v}_s T_e + \dot{v}_{oa} T_{oa} + \dot{v}_m T_R$$

Therefore, $T_e = \frac{\dot{v}_{oa} T_{oa} + \dot{v}_m T_R}{\dot{v}_s}$ $$\frac{dT_{z_1}}{dt} = -\left(\frac{1}{R_{oa_1} V_1 \rho C_p} + \frac{1}{R_{m_1} V_1 \rho C_p}\right) T_{z_1} +$$

$$\frac{1}{R_{m_1} V_1 \rho C_p} T_{m_1} + \frac{1}{R_{oa_1} V_1 \rho C_p} T_{oa} + \frac{1}{V_1 \rho C_p} \dot{Q}_{Other_1} + \frac{\dot{v}_{s_1}}{V_1}(55 - T_{z_1})$$

$$\frac{dT_{m_2}}{dt} = \frac{1}{R_{m_2} C_{m_2}} T_{z_2} + \frac{-1}{R_{m_2} C_{m_2}} T_{m_2}$$

$$\frac{dT_{z_3}}{dt} = -\left(\frac{1}{R_{oa_3} V_3 \rho C_p} + \frac{1}{R_{m_3} V_3 \rho C_p}\right) T_{z_3} +$$

$$\frac{1}{R_{m_3} V_3 \rho C_p} T_{m_1} + \frac{1}{R_{oa_3} V_3 \rho C_p} T_{oa} + \frac{1}{V_3 \rho C_p} \dot{Q}_{Other_3} + \frac{\dot{v}_{s_3}}{V_3}(55 - T_{z_3})$$

$$\frac{dT_{m_3}}{dt} = \frac{1}{R_{m_3} C_{m_3}} T_{z_3} + \frac{-1}{R_{m_3} C_{m_3}} T_{m_3}$$

$$V_R \frac{dT_R}{dt} \approx 0 = -\dot{v}_S T_R + \dot{v}_{s1} T_{z_1} + \dot{v}_{s2} T_{z_2} + \dot{v}_{s3} T_{z_3}$$

therefore, $T_R = \frac{\dot{v}_{s1} T_{z_1} + \dot{v}_{s2} T_{z_2} + \dot{v}_{s3} T_{z_3}}{\dot{v}_S}$ where the indices n=1, 2, and 3 refer to the zones 1, 2, and 3 (e.g., zones 608a, 608b, and 608c), the temperature $T_e$ is the entering temperature which is a mixture temperature of the return air $\dot{v}_m$ and outdoor air temperatures of the outdoor air $\dot{v}_{oa}$, $T_R$ is temperature of return air (e.g., temperature of the return air $\dot{v}_s$), $T_{oa}$ is temperature of outdoor air (e.g., air drawn at the rate $\dot{v}_{oa}$), $T_{z_n}$ is a temperature of an nth zone, $R_{oa_n}$ is a difference in thermal resistance between indoor air (e.g., of the nth zone) and outdoor air, $V_n$ is volume of the nth zone, $\rho$ is density of air, $C_p$ is thermal capacitance of air, $T_{m_n}$ is building mass temperature of the nth zone, and $\dot{Q}_{other}$ is internal heat load or gains of the nth zone due to solar radiation, occupancy, and electrical equipment. In some embodiments, duct volume where the mixing of the outdoor air and the return air occurs is very small and therefore the differential equation that describes that balance has extremely fast dynamics such that $$V_e \frac{dT_e}{dt} \approx 0.$$

Accordingly, the computation of $T_e$ may become a simple weighted average of the temperatures from the return air and outdoor air. In some embodiments, a cooling coil of the AHU 620 performs cooling to bring the temperature of air entering the AHU 620 down to 55 degrees F. before sending the air into the zones. In some embodiments, the computation of $T_R$ becomes a simple weighted average of the temperatures existing all zones. In some embodiments, the return air temperature $T_R$ for an n number of zones is generally defined by $$T_R = \frac{\sum_{i=1}^{n} \dot{v}_{s_i} T_{z_i}}{\dot{v}_s}.$$

In some embodiments, multi-zone humidity dynamics can be similarly developed, which result in, for an n number of zones:

$$\varphi_{H2O,R} = \frac{\sum_{i=1}^{n} \dot{v}_{si} \varphi_{H2O,zi}}{\dot{v}_S}$$

where $\dot{v}_{si}$ is the cold air supply rate of the VAV unit 616 of the ith zone, $\dot{v}_s$ is the total cold air supply rate of the VAV units 616, $\varphi_{H2O,zi}$ is humidity of the ith zone, and $\varphi_{H2O,R}$ is return air humidity concentration (e.g., of all zones).

In some embodiment's, multi-zone CO2 dynamics may be modeled (e.g., by the controller 1102 described in greater detail below) as:

$$V_e \frac{d \varphi_{CO2,e}}{dt} \approx 0 = -\dot{v}_S \varphi_{CO2,e} + \dot{v}_{oa} \varphi_{CO2,oa} + \dot{v}_m \varphi_{CO2,R}$$

Therefore, $\varphi_{CO2,e} = \frac{\dot{v}_{oa} \varphi_{CO2,oa} + \dot{v}_m \varphi_{CO2,R}}{\dot{v}_S}$ $$\frac{d \varphi_{CO2,z_1}}{dt} = -\frac{\dot{v}_{s_1}}{V_1} \varphi_{CO2,z_1} + \frac{\dot{v}_{s_1}}{V_1} \varphi_{CO2,e} + \dot{\varphi}_{CO2,dist_1}$$

$$\frac{d \varphi_{CO2,z_2}}{dt} = -\frac{\dot{v}_{s_2}}{V_2} \varphi_{CO2,z_2} + \frac{\dot{v}_{s_2}}{V_2} \varphi_{CO2,e} + \dot{\varphi}_{CO2,dist_2}$$

$$\frac{d \varphi_{CO2,z_3}}{dt} = -\frac{\dot{v}_{s_3}}{V_3} \varphi_{CO2,z_3} + \frac{\dot{v}_{s_3}}{V_3} \varphi_{CO2,e} + \dot{\varphi}_{CO2,dist_3}$$

$$V_R \frac{d \varphi_{CO2,R}}{dt} \approx 0 = -\dot{v}_S \varphi_{CO2,R} + \dot{v}_{s1} \varphi_{CO2,z1} + \dot{v}_{s2} \varphi_{CO2,z2}$$

Therefore $\varphi_{CO2,R} = \frac{\dot{v}_{s1} \varphi_{CO2,z1} + \dot{v}_{s2} \varphi_{CO2,z2} + \dot{v}_{s3} \varphi_{CO2,z3}}{\dot{v}_S}$ where the indices 1, 2, 3, etc., refer to different zones (e.g., zones 608a, 608b, and 608c), $\varphi_{CO2,e}$ is entering CO2 concentration (e.g., CO2 concentration of the mixture of return air and outdoor air), $V_1$, $V_2$, $V_3$ are volumes of the zones 608, $\varphi_{CO2,R}$ is the concentration of CO2 in return air, and $\varphi_{CO2,z_n}$ is the CO2 concentration in the nth zone. Assuming that the duct volume is negligibly small, it can be assumed that the differential equation that describes the balance of the mixing has sufficiently fast dynamics such that $$V_e \frac{d \varphi_{CO2,e}}{dt} \approx 0$$

and that the differential equation which describes the return air has sufficiently fast dynamics such that $$V_R \frac{d \varphi_{CO2,R}}{dt} \approx 0.$$

Accordingly, the concentration of CO2 in the return air can be simplified and generalized to:

$$\varphi_{CO2,R} = \frac{\sum_{i=1}^{n} \dot{v}_{si} \varphi_{CO2,zi}}{\dot{v}_S}$$

for an n number of zones 608. In some embodiments, dynamics of volatile organic compounds (VOC) and fine particles or particulate matter 2.5 microns or less in width (PM2.5) can be modeled similarly to the CO2.

Figure 7:
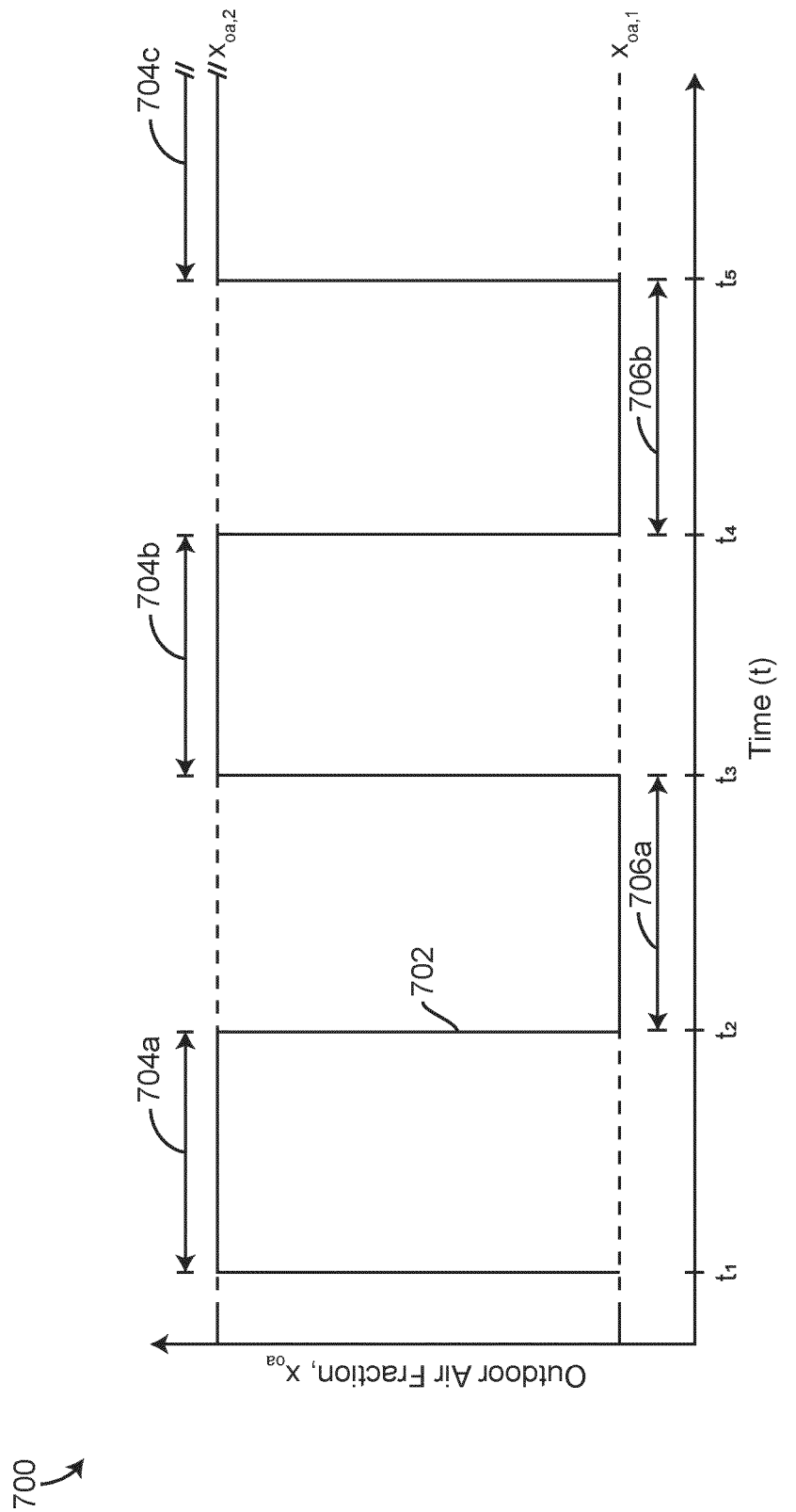
FIG. 7 is a graph of a duty cycle for the AHU of FIG. 6 having an outdoor air fraction that alternates between two values over time, according to some embodiments.

Referring to FIG. 7, the outdoor air fraction (e.g., $x_{oa}$) may alternate between a first value, $x_{oa,1}$ (e.g., a low threshold, a first threshold, a first minimum, a first air intake fraction, etc.) and a second value, $x_{oa,2}$ as illustrated by a graph 700. The graph 700 includes a series 702 that shows operation or transition of the AHU 620 between the first value $x_{oa,1}$ (e.g., a lower value) and the second value $x_{oa,2}$ (e.g., a higher value) over time. For example, between times $t_1$ and $t_2$ across a timer period 704a (e.g., a time interval), the AHU 620 may draw air from outdoors (e.g., $\dot{v}_{oa}$) according to the second value $x_{oa,2}$ of the outdoor air fraction (e.g., a higher value). Similarly, between times $t_2$ and $t_3$ across a time period 706a, the AHU 620 draws air from outdoors (e.g., $\dot{v}_{oa}$) according to the first value $x_{oa,1}$ (e.g., a lower value). In some embodiments, the series 702 is a periodic square wave (e.g., a periodic square wave). In some embodiments, the series 702 is a rectangular wave (e.g., such that the AHU 620 persists in operation according to the first value $x_{oa,1}$ longer than the second value $x_{oa,2}$ or vice versa). In some embodiments, the series 702 is a sawtooth wave or a triangle wave. Series 702 similarly illustrates time period 706b and time periods 704b and 704c. In some embodiments, series 702 periodically alternates between the first value $x_{oa,1}$ and the second value $x_{oa,2}$ according to a duty cycle, or according to a period.

In some embodiments, parameters of the series 702 such as the duty cycle, the period, the length of time that the AHU 620 persists in operation according to the first value $x_{oa,1}$ of the outdoor air fraction, and/or the length of time that the AHU 620 persists in operation according to the second value $x_{oa,2}$ of the outdoor air fraction are determined based on number of zones (e.g., zones 608a, 608b, 608c) that the AHU 620 serves, occupancy of the zones, classification of the zones, temperatures of the zones, humidity of the zones, thermal properties of the zones, size of the zones, average outdoor air temperature, location of the building 10, etc., or any combination thereof. In some embodiments, the parameters of the series 702 are predetermined or set by a building administrator or system designer. In some embodiments, the parameters of the series 702 are decision variables of an optimization (e.g., a model predictive control optimization, a model predictive maintenance optimization, a central plant optimization, etc.).

When the AHU 620 is operating to draw air according to the first value $x_{oa,1}$ (e.g., time periods 706a, 706b, etc.), the VAV unit 616 (e.g., dampers of the VAV unit 616 that control air flow to the zones of the building 10 such as zones 608a, 608b, and 608c) may be controlled to provide air to a first set of zones. Similarly, when the AHU 620 is operating to draw air according to the second value $x_{oa,2}$ (e.g., time periods 704a, 704b, 704c, etc.), the VAV unit 616 (e.g., dampers of the VAV unit 616 that control air flow to the zones of the building 10 such as zones 608a, 608b, and 608c) may be controlled to provide air to a second set of zones. In some embodiments, the second set of zones differ from the first set of zones in that the second set of zones are a completely different set of zones, that the second set of zones includes an additional one or more zones compared to the first set of zones, or that the second set of zones does not include one or more zones of the first set of zones. In this way, the VAV unit 616 and the AHU 620 can operate to provide air to different zones with different proportional amounts of outdoor air. For example, a highly populated zone of the building 10 may require additional fresh outdoor air in order to meet ventilation constraints of the zone (e.g., to reduce carbon dioxide (CO2) buildup in the zone) while also meeting temperature and humidity constraint. In some embodiments, the VAV units 616 are controlled to provide the additional fresh outdoor air to the first set of zones that require additional ventilation (e.g., the VAV units 616 are controlled to provide air to the first set of zones during the time periods 704 or during times when the AHU 620 operates to draw outdoor air according to the second value of the outdoor air intake fraction $x_{oa,2}$). On the other hand, a low populated zone of the building 10 may require less fresh outdoor air and therefore the VAV units 616 may operate to provide air to the low populated zones when the AHU 620 is operating to draw outdoor air according to the first air intake fraction $x_{oa,1}$.

It should be understood that while FIG. 7 shows the outdoor air fraction $x_{oa}$ alternating between two values, the outdoor air fraction may alternate between more than two values (e.g., three separate discrete values, four separate discrete values, etc.). In some embodiments, the outdoor air fraction $x_{oa}$ is continuously transitioned between different values, or continuously transitioned between different values and held at each of the different values for some amount of time before transitioning to the next value. In some embodiments, the second value $x_{oa,2}$ is 20% (e.g., 20% of air provided to the zones is drawn from outdoors) and the first value $x_{oa,1}$ is 10%. In some embodiments, the first value and the second value of the outdoor air fraction $x_{oa}$ are predetermined or set values. In some embodiments, the first value and the second value of the outdoor air fraction $x_{oa}$ are decision variables of any of the techniques described herein (e.g., decision variables of an optimization) that may be adjusted or determined in order to meet specific constraints (e.g., CO2 constraints in the zones, temperature constraints in the zones, energy consumption constraints, etc.).

Figure 8:
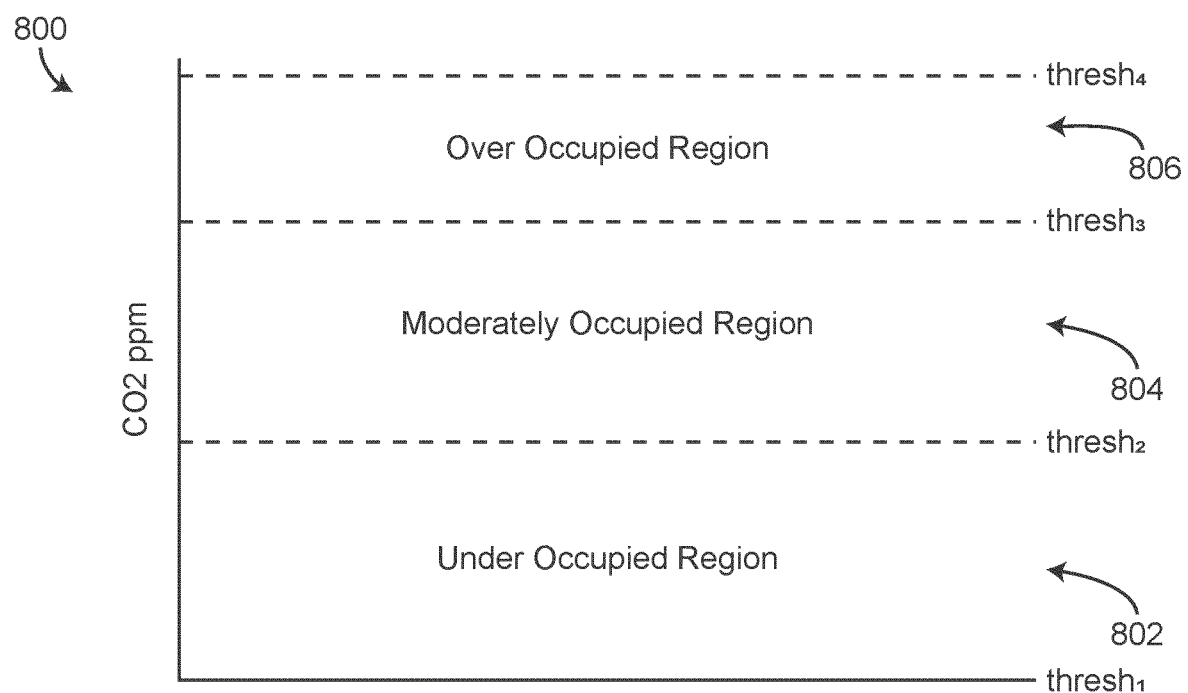
FIG. 8 is a diagram illustrating different levels of occupancy based on carbon dioxide (CO2) thresholds, according to some embodiments.
Figure 11:
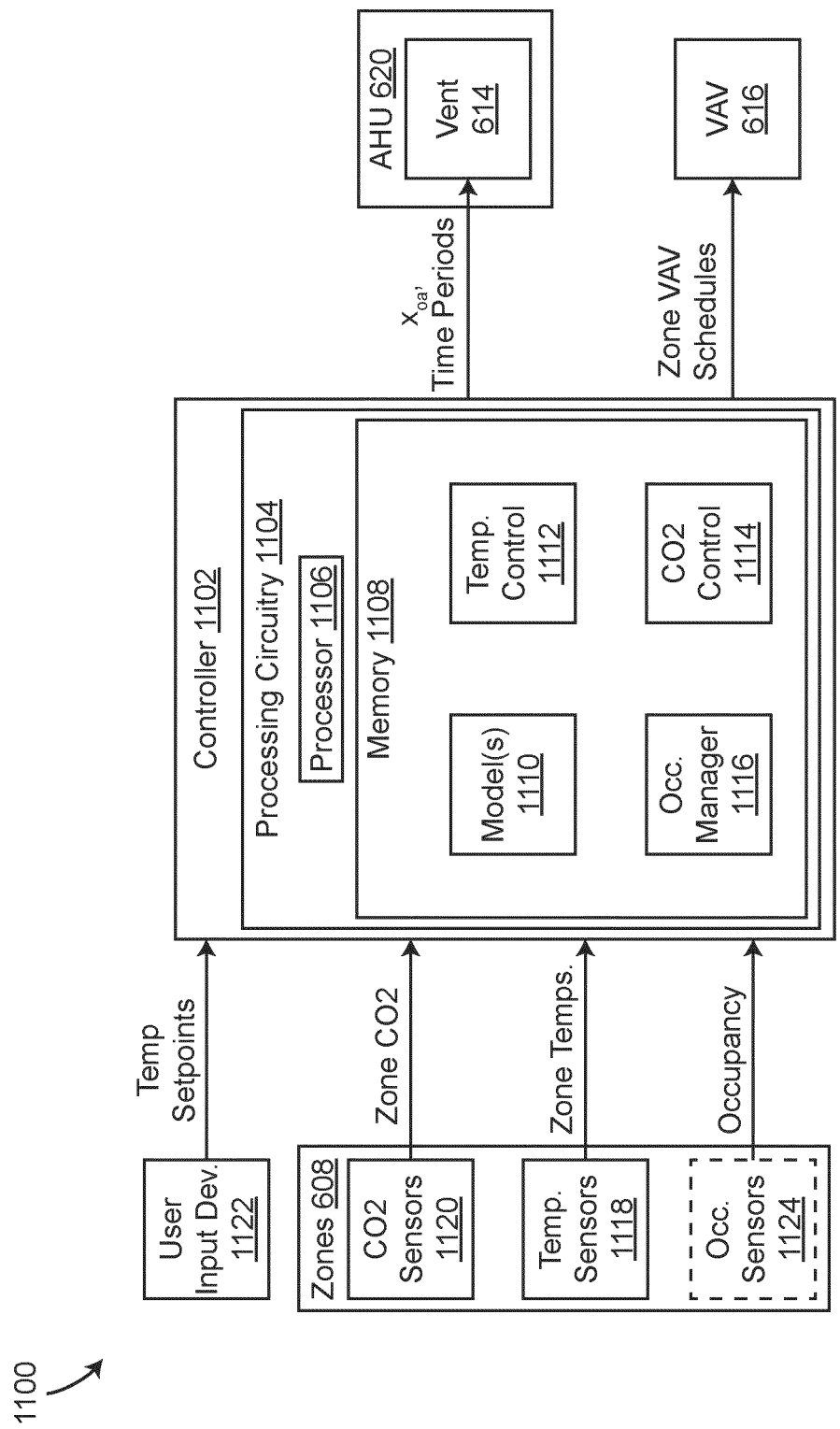
FIG. 11 is a block diagram of a control system and controller for operating an AHU and VAV units to change damper positions of the AHU and the VAV units to achieve desired temperature and CO2 control, according to some embodiments.

Referring to FIGS. 8 and 11, a control system 1100 includes a controller 1102 configured to control the AHU 620 to alternate the outdoor air fraction $x_{oa}$ between a high and low value (e.g., as shown in FIG. 7), and control the VAV units 616 to provide ventilation (e.g., air) to different zones during times in which the AHU 620 operates at the high value of the outdoor air fraction $x_{oa}$ and the low value of the outdoor air fraction $x_{oa}$, according to some embodiments. In some embodiments, the controller 1102 is configured to predict CO2 levels (e.g., predict or estimate CO2 levels of one or more zones of the building 10 into the future or at a future time) and develop controls (e.g., schedules, control signals, time-series control data, etc.) for the AHU 620 and the VAV units 616 to meet one or more constraints (e.g., ventilation constraints, CO2 constraints, temperature constraints, energy consumption constraints, etc.) at a current time, at a future time, or across a time horizon that extends into the future while also improving efficiency of the AHU 620 and the VAV units 616 or to optimize one or more parameters (e.g., energy consumption, electrical consumption, costs associated with purchasing electricity or energy, etc., of an entire HVAC system or a specific component of the HVAC system).

The control system 1100 also includes a user input device 1122, one or more CO2 sensors 1120, and one or more temperature sensors 1118, according to some embodiments. The CO2 sensors 1120 and the temperature sensors 1118 are positioned in the zones 608 and are configured to measure CO2 levels and temperature in the zones 608. In some embodiments, each of the zones 608 include a CO2 sensor and a temperature sensor. In some embodiments, the control system 1100 also includes humidity sensors, occupancy sensors, etc., positioned in one or more of, or each of, the zones 608.

The CO2 sensors 1120 are configured to obtain (e.g., measure, sense, detect, etc.) and provide measurements of CO2 in the zones 608, shown as zone CO2, to the controller 1102, according to some embodiments. In some embodiments, the controller 1102 is configured to obtain (e.g., from a network system, collected from the CO2 sensors 1120 over a time period, from a database, from a system administrator, etc.) historical CO2 data of the zones 608. In some embodiments, the controller 1102 is configured to use the historical data of the zones 608 to train a model to forecast, predict, or estimate CO2 concentrations in the zones 608.

The temperature sensors 1118 are configured to obtain (e.g., measure, sense, detect, etc.) and provide measurements of temperature in the zones 608, shown as zone temperatures, to the controller 1102, according to some embodiments. In some embodiments, the controller 1102 is configured to use the zone temperatures to determine controls for the VAV units 616 and the AHU 620 to maintain temperature within a range of a temperature setpoint (e.g., provided by the user input devices 1122, by thermostats or input devices in the zones 608, etc.). In some embodiments, the controller 1102 is configured to use the zone temperatures as inputs to a temperature model to predict temperature values of the zones 608. In some embodiments, the controller 1102 is configured to use the zone temperatures provided by the temperature sensors 1118 and the temperature setpoints provided by the user input device 1122 to determine an amount of volume of air that should be provided to the zones 608 to drive the zone temperatures towards the temperature setpoints.

Still referring to FIG. 11, controller 1102 is shown to include processing circuitry 1104 including a processor 1106 and memory 1108. Processing circuitry 1104 can be communicably connected to a communications interface such that processing circuitry 1104 and the various components thereof can send and receive data via the communications interface. Processor 1106 can be implemented as a general purpose processor, an application specific integrated circuit (ASIC), one or more field programmable gate arrays (FPGAs), a group of processing components, or other suitable electronic processing components.

Memory 1108 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 1108 can be or include volatile memory or non-volatile memory. Memory 1108 can include database components, object code components, script components, or any other type of information structure for supporting the various activities and information structures described in the present application. According to some embodiments, memory 1108 is communicably connected to processor 1106 via processing circuitry 1104 and includes computer code for executing (e.g., by processing circuitry 1104 and/or processor 1106) one or more processes described herein.

The memory 1108 is shown to include one or more models 1110, a temperature controller 1112, a CO2 controller 1114, and an occupancy manager 1116, according to some embodiments. The models 1110 may include a temperature model that predicts temperature of the zones 608 over a future time horizon as a function of one or more control decisions for the AHU 620 and/or the VAV unit 616 (e.g., the zone VAV schedules, the OAF, the time periods, etc.). The models 1110 can also include a humidity model that predicts humidity of the zones 608 over a future time horizon as a function of the one or more control decisions for the AHU 620 and/or the VAV 616. In some embodiments, the models 1110 include a CO2 model that is configured to predict CO2 concentrations of the zones 608 over a future time horizon as a function of the one or more control decisions for the AHU 620 and/or the VAV 616. In some embodiments, the temperature controller 1112 and/or the CO2 controller 1114 are performed locally at the VAV units 616, at the AHU 620, or at the zones 608.

The CO2 model can include a deterministic portion and a stochastic portion, according to some embodiments. In some embodiments, the controller 1102 is configured to collect historic data of the zone CO2s obtained from the CO2 sensors 1120 (e.g., over a training period) as well as control decisions for the AHU 620 and the VAV 616 and generate a model as the stochastic portion of the CO2 model. In some embodiments, the controller 1102 is configured to generate the stochastic portion of the CO2 model using a multi-dimensional regression, a neural network, machine learning, artificial intelligence, etc. In some embodiments, the deterministic model is based on any of the CO2 dynamics (e.g., the differential equation) described in greater detail above with reference to FIG. 6, and the controller 1102 is configured to adjust various parameters of the CO2 dynamics in order to determine the deterministic portion of the CO2 model. In some embodiments, the controller 1102 is configured to perform any of the model generation techniques described herein (e.g., based on historical data obtained from the CO2 sensors 1120) for each of the zones 608 to determine separate CO2 models for each of the zones 608.

The controller 1102 is also configured to use historic data obtained from the CO2 sensors 1120 to determine, train, generate, or adjust a stochastic portion of the CO2 model of the models 1110, according to some embodiments. In some embodiments, the controller 1102 is configured to use the deterministic portion of the CO2 model to determine a predicted CO2 concentration of the zone 608 for corresponding control decisions of the AHU 620 and/or the VAV units 616. The controller 1102 can determine a difference between the predicted CO2 concentration (e.g., an output of the deterministic portion) and a measured CO2 concentration for the zones 608 (e.g., $dCO2=CO2_{measured}-CO2_{predicted}$). In some embodiments, the stochastic portion of the CO2 model is determined by the controller 1102 using an integrator model or a decay autoregressive ("AR") model. The stochastic portion of the CO2 model may predict or determine a correction amount that is added or subtracted from the result of the deterministic portion of the CO2 model to improve accuracy of the CO2 model. In some embodiments, the controller 1102 is also configured to determine or generate temperature models, humidity models, energy consumption models, etc., of the zones 608 as a function of the control decisions for the AHU 620 and/or the VAV units 616, using similar techniques as the generation or determination of the CO2 models of each of the zones 608. In some embodiments, the stochastic portion of the CO2 model is a function that defines a correction for the deterministic portion of the CO2 model. In some embodiments, the stochastic portion is a correction amount for the deterministic portion of the CO2 model.

In some embodiments, the temperature model and the CO2 model are configured to predict temperature and CO2 concentration of a corresponding one of the zones 608, respectively, as a function of a rate of air delivered to the corresponding one of the zones 608 (e.g., $\dot{V}$) and a fresh air intake fraction of outdoor air (e.g., $x_{oa}$, a ventilation fraction). In some embodiments, the rate of air delivered $\dot{V}$ to the corresponding one of the zones 608 is controlled in order to achieve a desired temperature in the zone 608. In some embodiments, the fresh air intake fraction of outdoor air $x_{oa}$ is used or adjusted (e.g., between discrete values) to achieve a desired ventilation in the zone 608 (e.g., to achieve a desired concentration of CO2 in the zone 608 or maintain the CO2 concentration below a threshold, a "control objective"). In some embodiments, the controller 1102 is configured to generate models 1110 for each of the zones 608. For example, if the building 10 includes n number of zones 608, the controller 1102 can perform the model generation techniques described herein to generate n models 1110 (e.g., n number of temperature models, n number of CO2 models, etc.).

Referring particularly to FIG. 8, a graph 800 illustrates different regions (e.g., a first region, a second region, and a third region), shown as regions 802, 804, and 806, defined between different thresholds of CO2 (e.g., in parts per million "ppm"), shown as $thresh_1$, $thresh_2$, $thresh_3$, and $thresh_4$. Specifically, the first region 802 is defined between the first threshold $thresh_1$ and the second threshold $thresh_2$, the second region 804 is defined between the second threshold $thresh_2$ and the third threshold $thresh_3$, and the third region 806 is defined between the third threshold $thresh_3$ and the fourth threshold $thresh_4$. The first region 802 is an under occupied region, the second region 804 is a moderately occupied region, and the third region 806 of the graph 800 is an over occupied region. In some embodiments, the fourth threshold $thresh_4$ has a value of 942 ppm.

Referring again to FIG. 11, the occupancy manager 1116 may be configured to obtain the zone CO2s from the CO2 sensors 1120 and identify, based on the zone CO2s, which of the zones 608 are under occupied, which of the zones 608 are moderately occupied, and which of the zones are over occupied. In some embodiments, the occupancy manager 1116 is configured to compare the zone CO2s as measured (e.g., currently, historically, etc.) to the various thresholds as $thresh_1$, $thresh_2$, $thresh_3$, and $thresh_4$.

In some embodiments, if the zone CO2 as measured, referred herein as $CO2_{zone}$ is between the first threshold $thresh_1$ and the second threshold $thresh_2$ (e.g., $thresh_1 < CO2_{zone} < thresh_2$, or $thresh_1 \leq CO2_{zone} \leq thresh_2$, or $thresh_1 \leq CO2_{zone} < thresh_2$), the occupancy manager 1116 determines that the zone 608 is an under occupied zone. In some embodiments, if the zone CO2 as measured, $CO2_{zone}$ is between the second threshold $thresh_2$ and the third threshold $thresh_3$ (e.g., e.g., $thresh 2 < CO2_{zone} < thresh_3$, or $thresh_2 \leq CO2_{zone} \leq thresh_3$, or $thresh_2 \leq CO2_{zone} < thresh_3$), the occupancy manager 1116 determines that the zone 608 is a moderately occupied zone. In some embodiments, if the zone CO2 as measured, $CO2_{zone}$ is between the third threshold $thresh_2$ and the fourth threshold $thresh_3$ (e.g., e.g., $thresh 3 < CO2_{zone} < thresh_4$, or $thresh_3 \leq CO2_{zone} \leq thresh_4$, or $thresh_3 \leq CO2_{zone} < thresh_4$), the occupancy manager 1116 determines that the zone 608 is an over occupied zone. In some embodiments, the first threshold $thresh_1$ is 0 ppm. In some embodiments, the fourth threshold $thresh_4$ is an upper limit such as 942 ppm.

In some embodiments, the temperature controller 1112 is configured to determine the rate of air delivered to each of the zones 608, $\dot{V}$, based on zone temperatures obtained from the temperature sensors 1118, a control technique (e.g., feedback control, PID control, etc.) and temperature setpoints obtained from the user input devices 1122 (e.g., thermostats, wall mounted units, etc.). In some embodiments, the temperature controller 1112 is configured to determine the rate of air delivered to each of the zones 608 using the temperature model 1110 over a future time horizon. In some embodiments, the temperature controller 1112 is configured to determine zone VAV schedules for each of the VAV units 616 (e.g., a required flow rate of air into each of the zones 608 to maintain the zone temperature at the temperature setpoints, or within a deadband of the temperature setpoints). In some embodiments, the temperature controller 1112 is configured to determine positions for dampers of the VAV units 616 (e.g., a value of $pos_{damper}$, the position of the dampers in order to achieve the rate of air delivered $\dot{V}$ for temperature control), whereas the CO2 controller 1114 determines if and when the dampers of the VAV units 616 should be open.

In some embodiments, the CO2 controller 1114 is configured to obtain the zone VAV schedules, or current flow rate of air into the zones 608 (e.g., as determined by the temperature controller 1112) and use the zone VAV schedules or the current flow rate of air into the zones 608 to predict CO2 propagation of the zone 608 into a future time horizon (e.g., 1 hour), and to determine a minimum value of the fresh air intake fraction $x_{oa}$ required to maintain the zone 608 below the fourth threshold $thresh_4$ (e.g., 942 ppm). In some embodiments, the CO2 controller 1114 is configured to select the fresh air intake fraction $x_{oa}$ for the zones 608 from a plurality of predetermined (e.g., discrete) values of the fresh air intake fraction $x_{oa}$. For example, the fresh air intake fraction $x_{oa}$ may be selected as 0.2 (e.g., 20% outdoor air delivery), 0.15 (e.g., 15% outdoor air delivery), or 0.10 (e.g., 10% outdoor air delivery).

In some embodiments, the CO2 controller 1114 is configured to use the classification of the zone 608 in terms of the regions 802, 804, or 806 (e.g., if the zone 608 is classified as an over occupied zone, an under occupied zone, or a moderately occupied zone) to determine the fresh air intake fraction $x_{oa}$ required to maintain the zone 608 below the fourth threshold $thresh_4$. For example, if the zone CO2 indicates that the zone 608 is an over occupied zone (based on outputs provided by the occupancy manager 1116), the CO2 controller 1114 may select the highest value of the fresh air intake fraction $x_{oa}$ (e.g., 0.20). In some embodiments, the CO2 controller 1114 is configured to use the CO2 model 1110 to simulate CO2 concentration of the zone 608 for the various discrete values of the fresh air intake fraction $x_{oa}$ to determine which of the discrete values of the fresh air intake fraction $x_{oa}$ achieve maintaining the CO2 concentration below the fourth threshold $thresh_4$ over the entirety of the future time period (e.g., over the entirety of the simulation horizon, an hour into the future, etc.). The CO2 controller 1114 may select the lowest of the discrete values of the fresh air intake fraction $x_{oa}$ that achieves maintaining the CO2 concentration of the zone 608 less than the fourth threshold $thresh_4$ over the entirety of the future time period, including times at which no air is delivered to the zone 608. In some embodiments, the CO2 controller 1114 is configured to use the discrete values of the fresh air intake fraction $x_{oa}$ to determine time periods of different accessible ventilation rates for the simulation performed using the CO2 model 1110. In some embodiments, if there are three discrete values of the fresh air intake fraction $x_{oa}$, then the AHU 620 may be transitioned between each of the three values of the fresh air intake fraction $x_{oa}$ over a time period such as an hour, for three time period subsets (e.g., three equal time period subsets).

For example, if the time period is an hour, the AHU 620 can be transitioned into operating using the first value of the fresh air intake fraction for the first twenty minutes of the hour, transitioned into operating using the second value of the fresh air intake fraction over the next twenty minutes of the hour, and transitioned into operating using the third value of the fresh air intake fraction over the last twenty minutes of the hour. The CO2 controller 1114 can use the CO2 model 1110 to simulate different control strategies for the zone 608 across the entire time period (e.g., the entire hour). For example, the CO2 controller 1114 can simulate providing air into the zone 608 at the flow rate $\dot{V}$ across the first time period subset where the AHU 620 operates according to the first value of the fresh air intake fraction (e.g., 0.10) to determine if this operation of the VAV units 616 will result in the predicted CO2 concentration of the zone 608 being maintained below the fourth threshold $thresh_4$ (e.g., including the second subset, and the third subset of the time period where the zone 608 does not receive air, and the VAV unit 616 shuts off air delivery to the zone 608). If providing air to the zone 608 across the time period subset associated with the AHU 620 operating according to the first value of the fresh air intake fraction is predicted to maintain the zone 608 less than the fourth threshold $thresh_4$ for the entirety of the time period (including subsequent time period subsets), then the CO2 controller 1114 may select the first value of the fresh air intake fraction for the zone 608. In some embodiments, the CO2 controller 1114 uses the model 1110 to simulate CO2 concentration of the zone 608 across the time period, assuming the zone 608 is provided with air over the time period subsets associated with the first value of the fresh air intake fraction, the second value of the fresh air intake fraction, and the third fresh air intake fraction to identify a smallest value of the values of the fresh air intake fraction that can be used to provide air to the zone 608 to maintain the CO2 concentration in the zone 608 less than the fourth threshold $thresh_4$ for the entirety of the time period.

In some embodiments, the CO2 controller 1114 is configured to use the techniques described herein to determine an associated value of the fresh air intake fraction for each of multiple zones 608. In this way, the CO2 controller 1114 can use the CO2 models 1110 of each of the multiple zones 608 to determine a first subset of the zones 608 that can be sufficiently ventilated using the first value of the fresh air intake fraction (e.g., zones for which $x_{oa}=x_{oa,1}$ can be used to maintain CO2 concentrations below a threshold), a second subset of the zones 608 that can be sufficiently ventilated using the second value of the fresh air intake fraction (e.g., zones for which $x_{oa}=x_{oa,2}$ can be used to maintain CO2 concentrations below a threshold), and a third subset of the zones 608 that can be sufficiently ventilated using the third value of the fresh air intake fraction (e.g., zones for which $x_{oa}=x_{oa,3}$ can be used to maintain CO2 concentrations below a threshold). The CO2 controller 1114 may, based on the identified subsets of the zones 608, generate VAV schedules for the VAV units 616 so that the subsets of the zones 608 are supplied with air at the rate $\dot{V}$ across time periods associated with the corresponding value of the fresh air intake fraction $x_{oa}$, or across a portion of the time periods associated with the corresponding value of the fresh air intake fraction $x_{oa}$. In some embodiments, the occupancy manager 1116 may collect data over time regarding which of the zones 608 are associated with which of the values of the fresh air intake fraction $x_{oa}$ and perform a clustering analysis to determine which of the zones 608 are typically over occupied, under occupied, or moderately occupied (e.g., based on the assumption that increased CO2 concentrations and thereby increased ventilation can predict occupancy). The clustering analysis of the zones 608 can be used for future iterations of the functionality of the controller 1102 to default to a specific value of the fresh air intake fraction $x_{oa}$ for the zones 608 based on historical occupancy data, CO2 concentration data, or values of the fresh air intake fraction $x_{oa}$.

In some embodiments, the controller 1102 is configured to re-perform any of the techniques described herein at periodic intervals (e.g., every hour, every three hours, etc.). In some embodiments, for example, one or more zones 608 may transition from being under occupied at one hour, to becoming over occupied at a different hour of the day, and therefore require different rates of ventilation (e.g., increased fresh air intake to maintain CO2 concentrations below the threshold).

In some embodiments, the CO2 controller 1114 is configured to use the CO2 models 1110 of the zones 608 to predict CO2 concentrations or propagations across a time horizon that includes multiple cycles or time periods across which the AHU 620 is transitioned between the discrete values of the fresh air intake fraction. For example, if the AHU 620 is transitioned between three values of the fresh air intake fraction $x_{oa}$ across an hour time period (e.g., so that the AHU 620 operates according to each of the three values of the fresh air intake fraction for 20 minutes), the CO2 controller 1114 may alternatively or additionally use the CO2 model 1110 to predict or simulate CO2 concentrations of the zones 608 over a time period longer than an hour (e.g., 3 additional hours). In some embodiments, the additional time period is sequential with the time period or the time horizon described above. In this way, any ventilation action performed or simulated using the CO2 model 1110 may be used to predict CO2 propagation for a significant amount of time into the future.

In some cases, when one of the zones 608 is initially occupied with few occupants, thereby resulting in a relatively low measurement of CO2, (e.g., early in the day before all occupants have entered the zone 608), a low ventilation rate (i.e., a low value of the fresh air intake fraction) can be used to maintain the CO2 in the zone 608, but the CO2 levels in the zone 608 will rise to near the threshold (e.g., the fourth threshold $thresh_4$ such as 942 ppm). If the zone 608 becomes occupied with multiple new occupants and quickly transitions from under occupied to over occupied, the CO2 levels may quickly rise and exceed the threshold. In some embodiments, the CO2 controller 1114 is configured to perform the simulation or the prediction using the CO2 model 1110 for a time period into the future as described above (e.g., four hours) that includes multiple cycles of the AHU 620 through the values of the outdoor air fraction to determine the minimum value of the fresh air fraction $x_{oa}$ for a first portion of the time period (e.g., 1 hour) that will maintain the CO2 of the zone 608 less than the threshold for the entire time period, with a second portion of the time period (e.g., the three hours following the first hour) being set to the highest value of the fresh air intake fraction.

Figure 9:
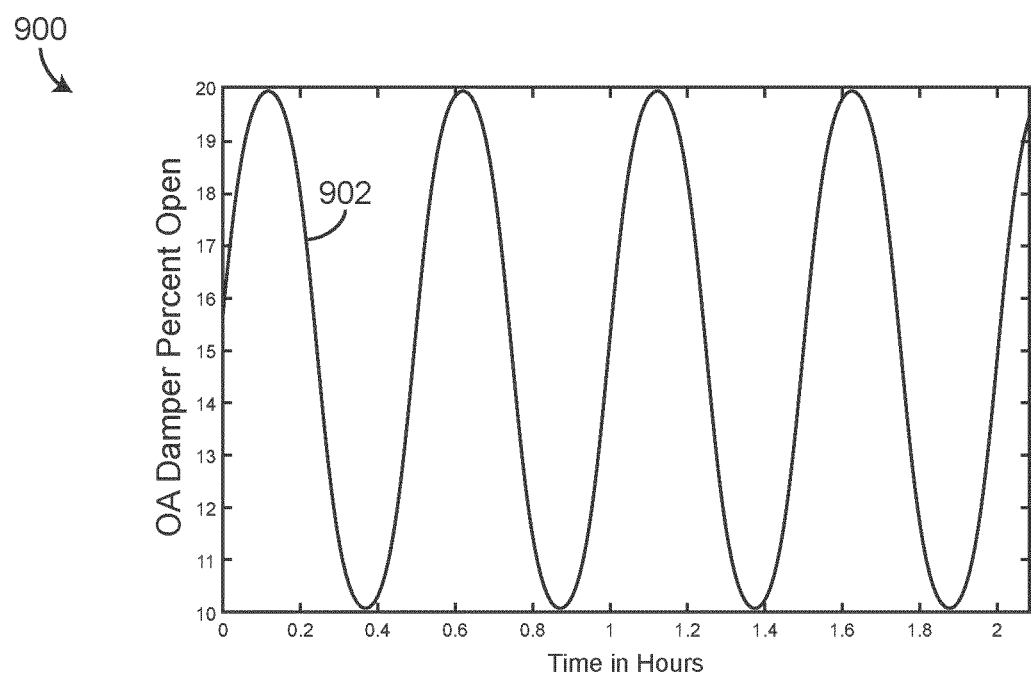
FIG. 9 is a graph illustrating a damper position of an AHU changing continuously over time according to a sinusoid function, according to some embodiments.

Referring to FIG. 9, a graph 900 illustrates an alternative approach to adjusting the fresh air intake fraction $x_{oa}$ of the AHU 620 over time, according to some embodiments. In some embodiments, the AHU 620 periodically transitions between discrete values (e.g., two discrete values, three discrete values, four discrete values, etc.) of the fresh air intake fraction $x_{oa}$ (shown in FIG. 7). In some embodiments, the AHU 620 continuously varies between a first value of the fresh air intake fraction (shown as 20%) and a second value of the fresh air intake fraction (shown as 10%) as illustrated by series 902. The series 902 may have a sinusoid shape, a saw tooth shape, etc.

Referring again to FIG. 11, if the AHU 620 varies continuously between two values of the fresh air intake fraction $x_{oa}$, the CO2 controller 1114 can use the CO2 model 1110 to determine a range of values that are acceptable to maintain the CO2 levels or concentrations of each of the zones 608 less than the fourth threshold thresh$_4$ (e.g., 942 ppm) across the time interval simulated using the CO2 model 1110. In some embodiments, the CO2 controller 1114 uses the CO2 model 1110 to determine discrete values, but then determines a range of time during which the AHU 620 continuously varies the fresh air intake fraction $x_{oa}$ that would result in an average or weighted average of the fresh air intake fraction $x_{oa}$ being substantially equal to the discrete value of the fresh air intake fraction $x_{oa}$. For example, if the CO2 controller 1114 determines that a subset of the zones 608 should be provided with air having a fresh air intake fraction $x_{oa}$ of 20%, the CO2 controller 1114 may determine that the subset of zones 608 should be provided with air for 10 minutes preceding the AHU 620 operating at $x_{oa}$=0.2 and for 10 minutes following the AHU 620 operating at $x_{oa}$=0.2. In some embodiments, the CO2 controller 1114 is configured to use the techniques described above to determine the minimum value of the fresh air intake fraction for the subset of zones 608, and once the AHU 620 reaches the minimum value of the fresh air intake fraction, operate the VAV units 616 to draw air for a predetermined amount of time (e.g., 20 minutes following). The occupancy manager 1116 may use historic data of the CO2 concentrations of the zones 608 to cluster the zones 608 into over occupied zones, moderately occupied zones, and under occupied zones. The CO2 controller 1114 can use the clustering of the zones 608 (e.g., a classification of each of the zones 608) to transition the VAV units 616 between delivering air across corresponding time intervals as the AHU 620 operates to continuously vary the fresh air intake fraction $x_{oa}$.

The controller 1102 can operate the AHU 620 (e.g., a vent or damper 614 of the AHU 620) by providing control decisions, control signals, setpoints, etc., or scheduled control decisions to the AHU 620. In some embodiments, the AHU 620 includes a controller that is configured to receive communications from the controller 1120 and operate the damper 614 to transition the AHU 620 between the values of the fresh air intake fraction $x_{oa}$ over various time periods, or continuously as a function of time. Similarly, the VAV units 616 can include controllers configured to receive the communications from the controller 1102 (e.g., schedules for when the VAV units 616 should deliver air from the AHU 620 to the corresponding zones 608) and use the communications to operate dampers of the VAV units 616 to provide air to the zones 608 at a rate (e.g., a volumetric flow rate) according to the communications.

Figure 10:
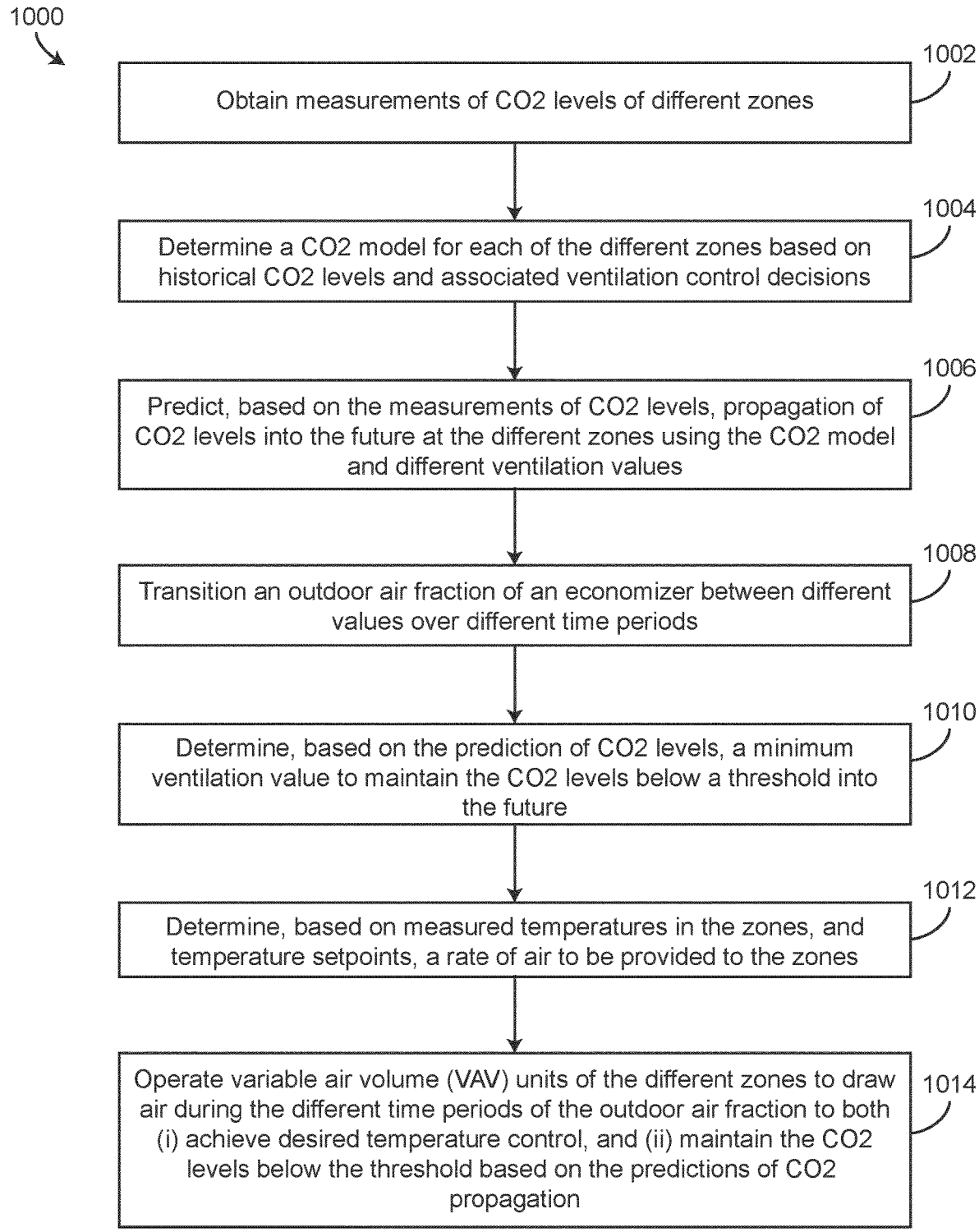
FIG. 10 is a flow diagram of a process for determining damper positions of an AHU and VAV units to satisfy temperature and CO2 constraints for one or more zones, according to some embodiments.

Referring to FIG. 10, a flow diagram of a process 1000 for controlling an AHU and VAV units to efficiently maintain CO2 levels in one or more zones below a threshold includes steps 1002-1014, according to some embodiments. In some embodiments, the process 1000 is performed by the control system 1100, or more specifically, by the controller 1102 of the control system. Advantageously, the process 1000 provides a technique for maintaining CO2 at acceptable values for multiple zones by changing fresh air intake fraction of the AHU (e.g., AHU 620) over time. In some embodiments, the process 1000 is performed for when outdoor air is cooler than a desired temperature setpoint of the zones.

The process 1000 includes obtaining measurements of CO2 levels of different zones (step 1002), according to some embodiments. In some embodiments, the CO2 levels are provided by CO2 sensors or detectors (e.g., CO2 sensors 1120) that are positioned within each of the different zones. The zones may be zones of a building (e.g., building 10) that are served by an AHU and VAV units. The zones can include occupants, and may generally be classified as under occupied, moderately occupied, or over occupied. In some embodiments, step 1002 is performed by the controller 1102 by receiving zone CO2 measurements from the CO2 sensors 1120. In some embodiments, step 1002 is performed in real-time to obtain current or recent measurements of the CO2 levels (e.g., in ppm) of each of the zones. In some embodiments, the step 1002 is performed over a time period in order to collect historical data.

The process 1000 includes determining a CO2 model for each of the different zones based on historical CO2 levels and associated ventilation control decisions (step 1004), according to some embodiments. In some embodiments, step 1004 is performed based on historical data obtained in step 1002. In some embodiments, step 1004 includes performing a model generation technique such as training a neural network, using machine learning, performing multi-dimensional regressions, etc., to generate a model for each of the zones that predicts CO2 concentration or levels as a function of control decisions (e.g., as a function of positions of dampers of the VAV units 616, the fresh air intake fraction $x_{oa}$ of the AHU 620, etc.). In some embodiments, step 1004 includes generating both a deterministic portion and a stochastic portion of the CO2 model (e.g., the CO2 model 1110). In some embodiments, the CO2 model is an integrator model or a decay AR model. In some embodiments, step 1004 also includes generating temperature models for each of the zones using similar techniques.

The process 1000 includes predicting, based on the measurements of CO2 levels, propagation of the CO2 levels into the future in the different zones using the CO2 model and different ventilation values (step 1006), according to some embodiments. In some embodiments, step 1006 is performed by the controller 1102, or more specifically, by the CO2 controller 1114 and the CO2 model 1110. In some embodiments, step 1006 includes predicting propagation of the CO2 levels into the future for different values of the ventilation (e.g., different values of fresh air intake fraction $x_{oa}$). In some embodiments, step 1006 is performed to predict CO2 propagation into a future time period such as 1 hour, 4 hours, etc. In some embodiments, the future time period (e.g., a future time horizon) is divided into a first portion (e.g., a first hour), and a second portion (e.g., a following three hours). In some embodiments, the second portion of the future time period is set to have a highest possible value of ventilation, and the prediction is performed for different values (e.g., different discrete values) of the ventilation. In some embodiments, the prediction is performed for different values of the ventilation across the first portion of the future time period. In some embodiments, the ventilation value transitions between multiple discrete values (e.g., periodically), and simulating or predicting the CO2 levels for a particular value includes predicting CO2 propagation of the zones when the zone receives air across a time period that the ventilation value is at the particular value. In some embodiments, step 1006 includes predicting or performing a simulation of the CO2 propagation for the zone even across time periods when the zone is not provided with air.

The process 1000 also includes transitioning an outdoor air fraction of an economizer (e.g., a portion of an AHU, a vent of an AHU, etc.) between different values over different time periods (step 1008), according to some embodiments. In some embodiments, the different values of the outdoor air fraction are discrete values and the economizer is periodically transitioned between the different discrete values. For example, the economizer may operate with a value of 10% for the outdoor air fraction across a first twenty minutes, then operate with a value of 15% for the outdoor air fraction across a second twenty minutes, and finally operate with a value of 20% for the outdoor air fraction across a third twenty minutes before repeating indefinitely. In some embodiments, transitioning the outdoor air fraction of the economizer between different values provides different time periods or opportunities for differently classified zones (e.g., zones that require different amounts of ventilation) to be provided with appropriate ventilation. In some embodiments, the outdoor air fraction of the economizer is transitioned continuously over time (e.g., in a sinusoidal manner). In some embodiments, step 1008 is performed by the CO2 controller using the CO2 model 1110 (e.g., the CO2 model determined or generated in step 1004).

The process 1000 includes determining, based on the prediction of the CO2 levels, a minimum ventilation value to maintain the CO2 levels below a threshold into the future (e.g., across a future time period) (step 1010), according to some embodiments. In some embodiments, step 1010 includes analyzing the results of step 1006 and selecting a lowest value of the different ventilation values that results in the CO2 in the zone being maintained below the threshold (e.g., 942 ppm) for the entire duration of the time period for which the prediction of step 1006 is performed. In some embodiments, step 1010 is performed by the CO2 controller 1114. In some embodiments, step 1010 is performed as a portion of step 1006, or is performed concurrently or at least partially simultaneously with step 1006.

The process 1000 includes determining, based on measured temperature in the zones, and temperature setpoints, a rate of air to be provided to the zones (step 1012), according to some embodiments. In some embodiments, step 1012 is performed by the temperature controller 1112 using a feedback control technique or a closed loop control scheme. The step 1012 is performed to determine the rate of air (e.g., V) and therefore a position of dampers of the VAV units 616 for each of the zones to drive the temperature towards the temperature setpoint, according to some embodiments.

The process 1000 includes operating VAV units of the different zones to draw air during the different time periods of the outdoor air fraction both (i) achieve a desired temperature control, and (ii) maintain the CO2 levels below the threshold based on the predictions of CO2 propagation (step 1014), according to some embodiments. In some embodiments, achieving the desired temperature and maintaining the CO2 levels below the threshold are control objectives (e.g., temperature and ventilation control objectives). In some embodiments, step 1014 is performed by the controller 1102 and includes providing control signals, control decisions, or other communications to the AHU 620 and the VAV units 616 so that the AHU 620 transitions between the different values of the outdoor air fraction, and the VAV units 616 operate dampers to provide air from the AHU 620 across the appropriate time period so that the zones receive the determined amount of ventilation (e.g., as determined in steps 1006 and 1010), and the air is provided at the appropriate rate (e.g., as determined in step 1012). In some embodiments, the amount of time that the VAV units 616 operate to provide the appropriately ventilated air is sufficiently short so that drawing the additional air to maintain the CO2 below the threshold negligibly affects the temperature of the zone.

Referring to FIGS. 11-18, the controller 1102 can be configured to provide time-varying controls to the AHU 620 and the VAV units 616 (or controllers of the AHU 620 and the VAV units 616) to adjust the damper 614 of the AHU 620 (e.g., the fresh air intake fraction $x_{oa}$) and positions of the dampers of the VAV units 616 (e.g., $pos_{damper}$ between fully closed, 0% and fully open, 100%) in a continuous or non-discrete manner. In some embodiments, the controller 1102 is configured to perform the techniques described herein with reference to FIGS. 11-18 when temperature of outdoor air of the building 10 is greater than temperature of return air from the zones 608 (e.g., assume outdoor air is 95 degrees F. or more). In situations where the outdoor air is hotter than the return or than the temperature setpoint (and cooling is desired), it is optimal to set the fresh air intake fraction to zero (e.g., $x_{oa}=0$) from heating and cooling perspectives, but from a ventilation perspective (e.g., to maintain CO2 at acceptable levels or concentrations), some amount of outdoor or fresh air should be used to ventilate the zones 608.

In some embodiments, the controller 1102 is configured to determine controls or schedules for both the fresh air intake fraction $x_{oa}$ and the position of the dampers $pos_{damper}$ to achieve desired CO2 and temperature control. In some embodiments, the controller 1102 (e.g., the CO2 controller 1114) is configured operate the AHU 620 to transition the fresh air intake fraction $x_{oa}$ according to a sinusoidal function. For example, the CO2 controller 1114 may operate the AHU 620 to adjust the damper 614 using a sine wave having the form:

$$\% \text{ Open}_{AHU} = A_0 \sin(wt) + b_0$$

where % $\text{Open}_{AHU}$ is a position of the damper 614 of the AHU 620 (e.g., % $\text{Open}_{AHU} = x_{oa} \cdot 100$), $A_0$ (e.g., amplitude of the sine function) and $b_0$ (e.g., bias of the sine function) are parameters, w is frequency of the sine function, and t is time. In some embodiments, the CO2 controller 1114 is configured to determine values of the parameters of the sine function (e.g., the amplitude $A_0$, the bias $b_0$, the frequency w) using one or more measurements such as zone CO2 (e.g., as measured by the CO2 sensors 1120), zone temperatures (e.g., as measured by the temperature sensors 1118), outdoor air temperature, etc. For example, an average value of the sinusoid may be determined by the CO2 controller 1114 assuming a worst-case scenario measurement of the CO2 in the zones. In some embodiments, a value of the frequency f is a preset or predetermined value that is based on effect of continuously moving the damper of the VAV units 616 on the reliability of a motor of the VAV units 616, and based on allowed fluctuations in the zone temperatures and/or the zone CO2. In some embodiments, the magnitude $A_0$ (e.g., magnitude of oscillations of the sinusoid) is determined by the CO2 controller 1114 based on a variation of all measurements of CO2 in the zones 608. In some embodiments, the parameters of the sinusoid (e.g., $A_0$, $b_0$, and w) are determined by feeding measurements (e.g., zone temperatures, zone CO2s, outdoor air temperature, etc.) to one or more proportional-integral-derivative (PID) controllers that determine values of the amplitude $A_0$, the frequency w, and the bias $b_0$. As shown in FIG. 9, the series 902 illustrates sinusoidal operation (e.g., continuous adjustment) of the AHU 620 (e.g., the % $\text{Open}_{AHU}$ or $x_{oa}$) assuming an amplitude of $A_0=5$, a frequency of w=2 (e.g., 2 cycles per hour), and a bias of $b_0=15$.

In some embodiments, the CO2 controller 1114 is also configured to determine variable or continuous controls for the VAV units 616 to transition (e.g., according to a sinusoidal or continuous function) the position of the dampers $pos_{damper}$ over time. In some embodiments, each of the zones 608 has an associated VAV unit 616 and controller. In some embodiments, any of the functionality of the CO2 controller 1114 as described herein with reference to determination of the position of the dampers $pos_{damper}$ over time is determined at the controllers associated with the zones 608 (e.g., VAV controllers).

The position of the dampers $pos_{dampers}$ of the VAV units 616 over time may be determined by the CO2 controller 1114 using the following form:

$$\% \ Open_{VAV} = A_i \sin(wt+\varphi_i) + b_i$$

where $A_i$ is the amplitude of the sinusoidal function, w is the frequency of the sinusoidal function, $b_i$ is the bias or offset of the sinusoidal function, and $\varphi_i$ is a phase shift of the sinusoidal function. In some embodiments, one or more of the parameters of the sinusoid for the position of the dampers $pos_{dampers}$ of the VAV units 616 are the same as the parameters of the sinusoid for the position of the damper 614 of the AHU (e.g., $A_0 = A_i$, $b_0 = b_i$, etc.). In some embodiments, the frequency of both of the sinusoid for the AHU 620 and the VAV units 616 are the same. In some embodiments, the sinusoid for the VAV units 616 (e.g., the damper position of the VAV units 616) is phase shifted relative to the sinusoid for the AHU 620, shown as $\varphi_i$. In some embodiments, the phase shift $\varphi_i$ is a tunable parameter. In some embodiments, the parameters of the sinusoid for the VAV units 616 are determined by the CO2 controller 1114 based on the measurements of the zone CO2s, measurement of inlet CO2, amount of air flow rate that has already been decided by the temperature controller 1112, etc. In some embodiments, the parameters of the sinusoid for the VAV units 616 are determined by the CO2 controller 1114 based on the zone temperatures provided by the temperature sensors 1118, a time of day, and/or a historic maximum concentration of CO2 for each of the zones 608. In some embodiments, an average value of the sinusoid for the VAV units 616 are determined by the CO2 controller 1114 based on an amount of cooling needed for the zone 608. In some embodiments, the CO2 controller 1114 is configured to use a PID controller to modulate an average value of airflow rate provided to the zone 608 as a function of an error between temperature in the zone 608, and a temperature setpoint for the zone 608. In some embodiments, the CO2 controller 1114 uses another PID controller to calculate the phase shift (e.g., $\varphi_i$) between the sinusoid for the AHU 620 and the sinusoid for the VAV units 616 as a function of an error between the zone CO2 and setpoint CO2. In some embodiments, a magnitude of the sinusoid for the VAV units 616 is increased if the zone 608 is overcooled in order to provide an appropriate amount of ventilation.

In some AHU/VAV systems, supply air is controlled to a constant temperature setpoint, such as 55 degrees F. Accordingly, an amount of cooling provided to the zone may be proportional to a rate at which air is provided to the zone, which in turn is proportional to damper position of the VAV unit. Accordingly, an average rate of cooling provided to each of the zones 608 may be proportional to the bias $b_i$. In some embodiments, a PID controller that controls zone temperatures may modulate the bias $b_i$ in order to change an amount of cooling provided to each of the zones 608. In some embodiments, the amount of fresh air provided to the zone 608 is determined by:

$$V_{oa} = x_{oa} V_{si}$$

where $V_{si}$ is a total amount of air provided to the zone 608, $x_{oa}$ is the fresh air intake fraction, and $V_{oa}$ is the volume or amount of fresh air provided to the zone 608.

In some embodiments, the amount of fresh air provided to the zones 608 is proportional to a product of the positions of the damper of the AHU 620 (e.g., $x_{oa}$ or $\% \ Open_{AHU}$) and the damper of the VAV units 616 (e.g., $pos_{damper}$ or $\% \ Open_{VAV}$). For example, $V_{oa}$ may be proportional to $(A_0 \sin(wt) + b_0)(A_i \sin(wt+\varphi_i) + b_i)$. Accordingly, on average, the amount of fresh air supplied to one of zones 608 is proportional to $$\left(\frac{A_0 A_i}{2}\right) \cos(\varphi_i) + b_0 b_i.$$

In some embodiments, $b_i$ is controlled by the CO2 controller 1114 or the temperature controller 1112 using the techniques described herein (e.g., PID control) based on cooling required by the zone 608. Accordingly, $b_0$, which affects CO2 provided to all the zones 608 can be used to control concentration of CO2 in a return duct of the system. Accordingly, $A_0$, $A_i$, and $\varphi_i$ may be controlled by the CO2 controller 1114 in order to achieve desired CO2 levels in each of the zones 608.

In some embodiments, the phase shift $\varphi_i$ controls an average amount of fresh air provided to the zone 608 (e.g., $V_{oa}$). Accordingly, the CO2 controller 1114 may implement PID control to modulate the value of $\varphi_i$ based on CO2 error (e.g., a difference between currently measured CO2 in the zone 608 and a desired CO2 level). If the phase shift $\varphi_i$ saturates at either $\varphi_i = 0$ or $\varphi_i = \pi$, then additional capacity may be required to vary the average amount of fresh air (e.g., $V_{oa}$), independently of cooling load. The additional capacity may be controlled by the product of $A_0$ and $A_i$. In some embodiments, to minimize an amount of damper movement required (e.g., damper movement of the VAV units 616 and the AHU 620), the product $A_0 A_i$ is modulated (e.g., by the CO2 controller 1114) for any of the zones 608 that has a saturated value of $\varphi_i$.

In some embodiments, the CO2 controller 1114 is configured to modulate the phase $\varphi_i$ between $0.05\pi$ and $0.95\pi$. In some embodiments, the product $A_0 A_i$ is used as a control variable by the CO2 controller 1114 that is controlled to maintain the phase shift $\varphi_i$ at either $\varphi_i = 0.05\pi$ or $\varphi_i = 0.95\pi$. In some embodiments, a gain of the controller that outputs values of the phase shift $\varphi_i$ (e.g., the CO2 controller 1114 or the temperature controller 1112) is continuously adjusted by a factor $$\frac{A_0 A_i}{2}$$

in order to maintain improved response.

In some embodiments, instead of a CO2 setpoint, the CO2 controller 1114 uses a fresh air flow setpoint for each of the zones 608. In some embodiments, the fresh air flow setpoint is determined by the CO2 controller 1114 based on floor area of the zones 608, and measured or estimated occupancy (e.g., as measured by occupancy sensors 1124). In some embodiments, a portion of the fresh air flow setpoint is based on the floor area of the zone 608, and a portion of the fresh air flow setpoint is based on the occupancy of the zone 608. In some embodiments, the CO2 controller 1114 is configured to calculate the fresh air flow setpoints for the zones 608 using ASHRAE guidelines. In some embodiments, any of the CO2 setpoints or measurements described in greater detail above are converted by the CO2 controller 1112 into fresh air setpoints or measurements.

Figure 12:
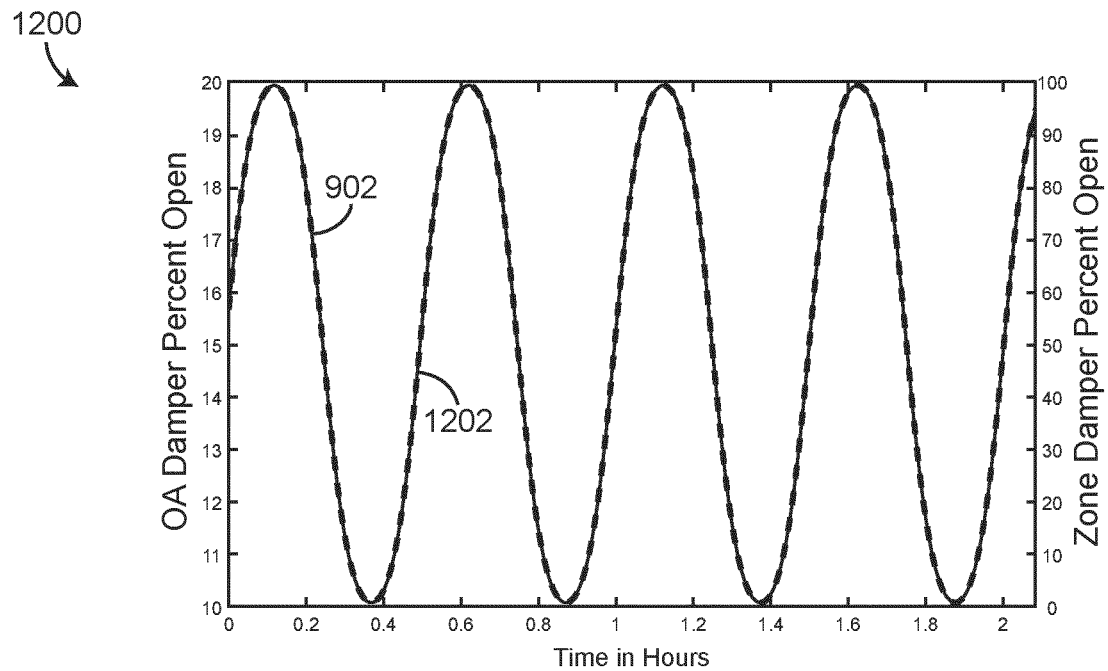
FIG. 12 is a graph illustrating a continuous adjustment to both an outdoor air damper position of an AHU and a zone damper position of a VAV unit, according to some embodiments.

Referring particularly to FIG. 12, a graph 1200 illustrates a control strategy (e.g., as determined by the controller 1102 using the sinusoid functions described in greater detail above) for a case when the amplitude $A_0=A_i=50$, the bias $b_0=b_i=50$, the phase shift $\varphi_i=0$ and the frequency w=2 cycles/hour. In some embodiments, the graph 1200 shows an AHU curve 902 that illustrates continuous change of the AHU 620 over time (e.g., % $Open_{AHU}$) and a VAV curve 1202 that illustrates continuous change of the VAV units 616 over time (e.g., % $Open_{VAV}$).

Figure 13:
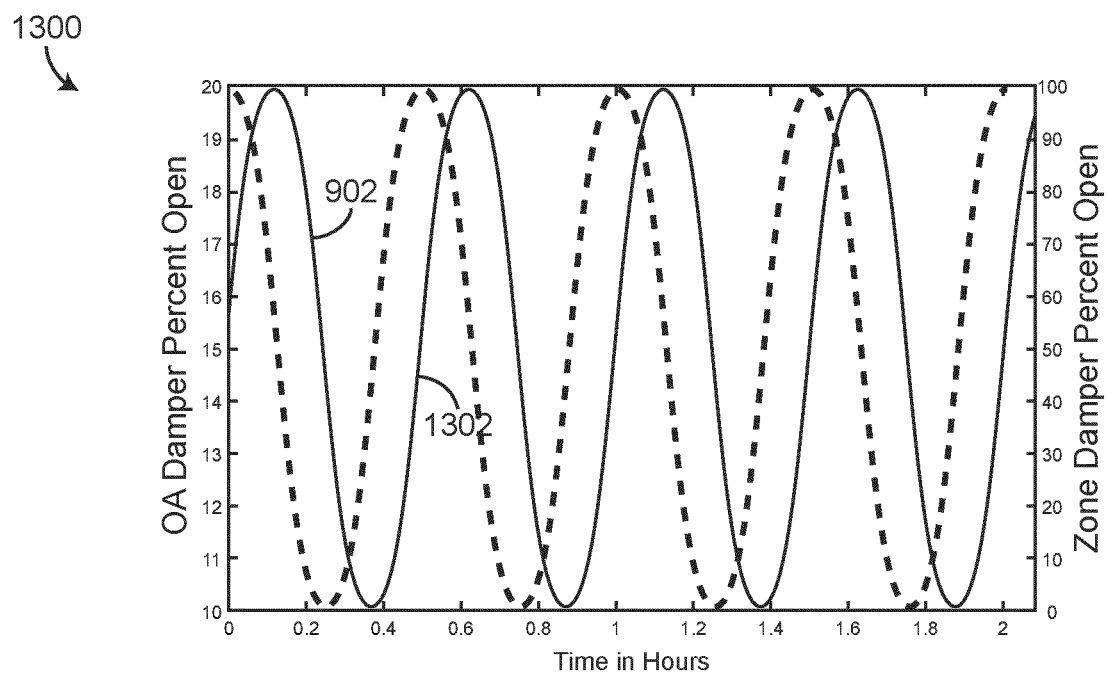
FIG. 13 is another graph illustrating a continuous adjustment to both an outdoor air damper position of an AHU and a zone damper position of a VAV unit, according to some embodiments.

Referring particularly to FIG. 13, a graph 1300 illustrates a control strategy (e.g., as determined by the controller 1102 using the sinusoid functions described in greater detail above) for a case when the amplitude $A_0=A_i=50$, the bias $b_0=b_i=50$, the phase shift $\varphi_i=90$ and the frequency w=2 cycles/hour. In some embodiments, the graph 1300 shows the AHU curve 902 that illustrates continuous change of the AHU 620 over time (e.g., % $Open_{AHU}$) and a VAV curve 1302 that illustrates continuous change of the VAV units 616 over time (e.g., % $Open_{VAV}$).

Figure 14:
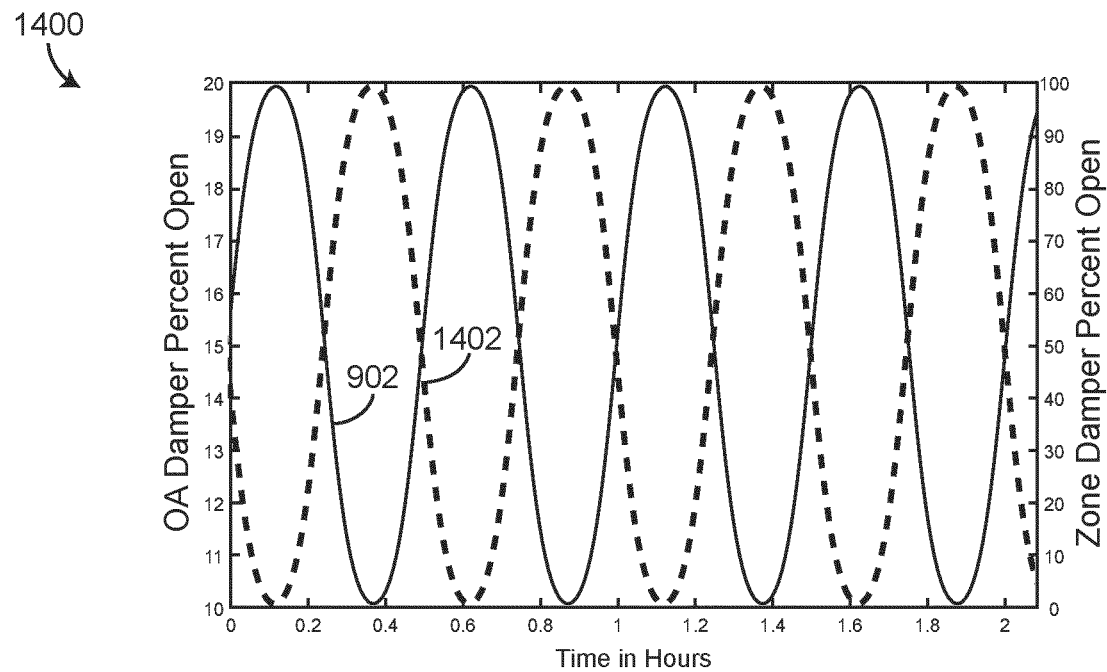
FIG. 14 is another graph illustrating a continuous adjustment to both an outdoor air damper position of an AHU and a zone damper position of a VAV unit, according to some embodiments.

Referring particularly to FIG. 14, a graph 1400 illustrates a control strategy (e.g., as determined by the controller 1102 using the sinusoid functions described in greater detail above) for a case when the amplitude $A_0=A_i=50$, the bias $b_0=b_i=50$, the phase shift $\varphi_i=180$ and the frequency w=2 cycles/hour. In some embodiments, the graph 1400 shows the AHU curve 902 that illustrates continuous change of the AHU 620 over time (e.g., % $Open_{AHU}$) and a VAV curve 1402 that illustrates continuous change of the VAV units 616 over time (e.g., % $Open_{VAV}$).

Figure 15:
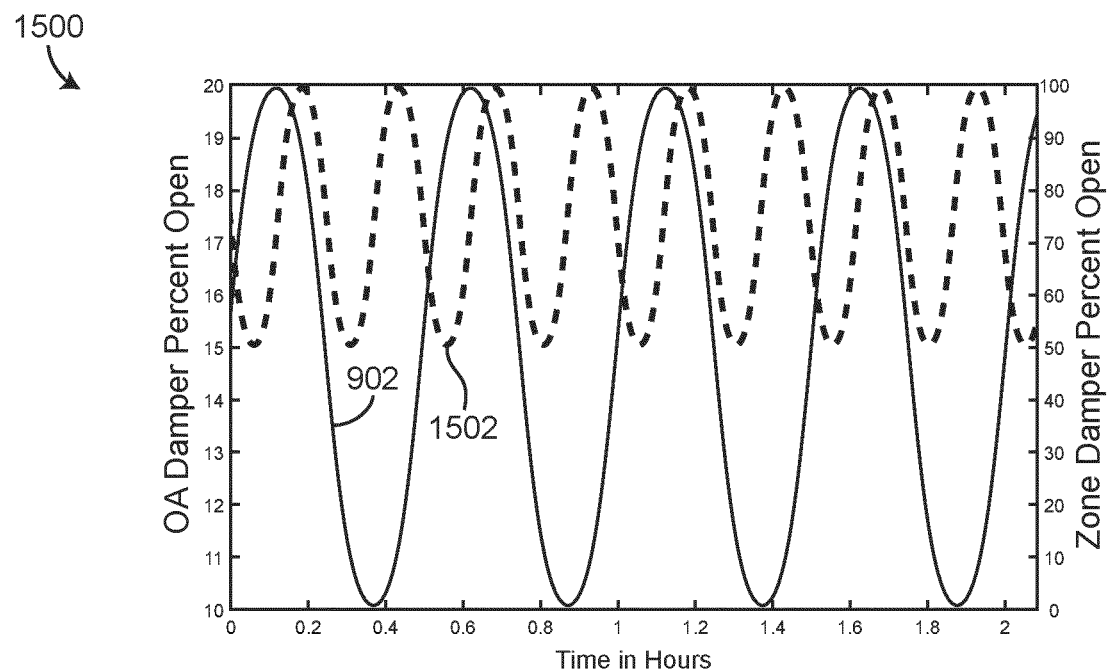
FIG. 15 is a graph illustrating a continuous adjustment to both an outdoor air damper position of an AHU and a zone damper position of a VAV unit, according to some embodiments.

Referring particularly to FIG. 15, a graph 1500 illustrates a control strategy (e.g., as determined by the controller 1102 using the sinusoid functions described in greater detail above) for a case when the amplitude $A_0=50$, the amplitude $A_i=25$, the bias $b_i=75$, the phase shift $\varphi_i=180$ and the frequency w=4 cycles/hour. In some embodiments, the graph 1500 shows the AHU curve 902 that illustrates continuous change of the AHU 620 over time (e.g., % $Open_{AHU}$) and a VAV curve 1502 that illustrates continuous change of the VAV units 616 over time (e.g., % $Open_{VAV}$).

Figure 16:
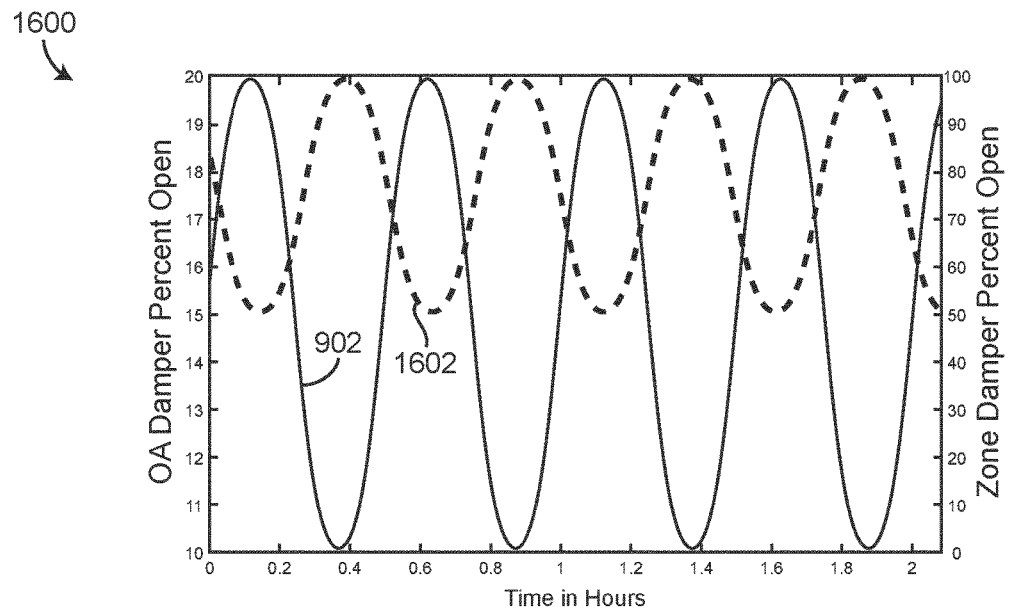
FIG. 16 is a graph illustrating a continuous adjustment to both an outdoor air damper position of an AHU and a zone damper position of a VAV unit, according to some embodiments.

Referring particularly to FIG. 16, a graph 1600 illustrates a control strategy (e.g., as determined by the controller 1102 using the sinusoid functions described in greater detail above) for a case when the amplitude $A_0=50$, the amplitude $A_i=25$, the bias $b_i=75$, the phase shift $\varphi_i=180$ and the frequency w=2 cycles/hour. In some embodiments, the graph 1600 shows the AHU curve 902 that illustrates continuous change of the AHU 620 over time (e.g., % $Open_{AHU}$) and a VAV curve 1602 that illustrates continuous change of the VAV units 616 over time (e.g., % $Open_{VAV}$).

Figure 17:
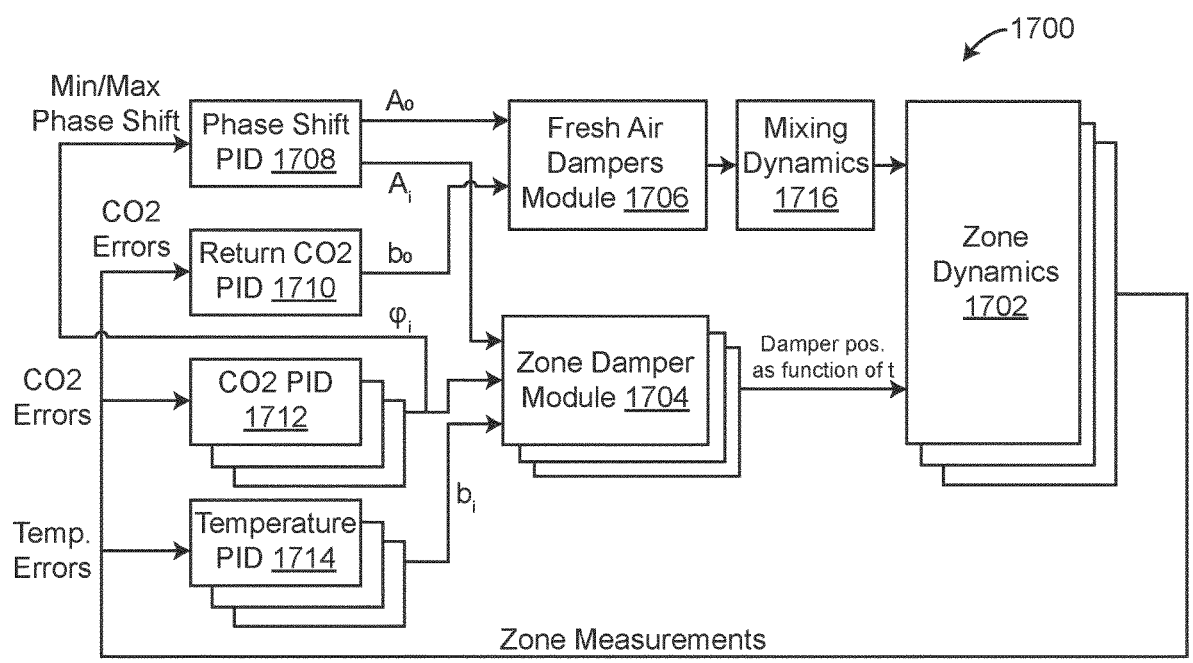
FIG. 17 is a block diagram of a control system for continuously adjusting damper positions of an AHU and multiple VAV units to achieve desired temperature control and CO2 control, according to some embodiments.

Referring to FIG. 17, a diagram of a control system 1700 that can be implemented on the controller 1102 (e.g., by the temperature controller 1112 and the CO2 controller 1114) includes zone dynamics 1702, one or more zone damper modules 1704, a fresh air damper module 1706, a phase shift PID controller 1708, a return CO2 PID controller 1710, a CO2 PID controller 1712, a temperature PID controller 1714, and mixing dynamics 1716. In some embodiments, the zone dynamics 1702 as shown represent the zones 608 or are a model of the zones 608 (e.g., as described in greater detail above with reference to FIG. 6). In some embodiments, the mixing dynamics 1716 similarly represent behaviors of the AHU 620 (e.g., as fresh air and recirculated air mixes) or is a model of the mixing dynamics of the fresh air and recirculated air through the AHU 620 and ducts thereof. In some embodiments, the zone damper modules 1704 include a same number of modules (e.g., controllers) as a number of the zones 608. For example, each zone 608 may include a separate zone damper module 1704 that controls damper position as a function of time, and thereby affects the zone dynamics 1702 (e.g., are inputs to behaviors of the zone dynamics 1702). In some embodiments, the fresh air damper module 1706 is a controller of the AHU 620 that controls damper position of the AHU 620 as a function of time (e.g., % $Open_{AHU}$ as a function of time). Similarly, the zone damper modules 1704 can control damper positions of the VAV units 616 as a function of time (e.g., % $Open_{VAV}$ as a function of time).

In some embodiments, zone measurements (e.g., temperature, humidity, CO2 levels, etc.) are received from sensors of the zones 608 and are used to determine CO2 errors and temperature errors (e.g., $e_{CO2}=CO2_{measured}-CO2_{setpoint}$, $e_{temp}=T_{measured}-T_{setpoint}$, etc.). The temperature error of the zones 608 are provided as inputs to multiple temperature PID controllers 1714, each of which is associated with a corresponding one of the zones 608. The temperature PID controller 1714 are configured to perform PID control to determine values of the bias $b_i$ for the sinusoid function of the VAV units 616 of each of the zones 608.

The CO2 PID controllers 1712 may function similarly to the temperature PID controller 1714 but using CO2 error (e.g., in the zones 608) as an input to perform PID control to determine values of the phase shift $\varphi_i$ for each of the zones 608 (or zone damper modules 1704 thereof). In some embodiments, the CO2 PID controller 1712 is configured to provide the phase shift $\varphi_i$ to the zone damper modules 1704 and the phase shift PID controller 1708 as inputs.

The return CO2 PID controller 1710 may function similarly to the CO2 PID controller 1712 but using CO2 error determined based on CO2 concentrations detected or measured in return air from the zones 608. The return CO2 PID controller 1710 uses the CO2 error as an input to perform a PID control technique to determine a value of the bias $b_0$. The value of the bias $b_0$ is provided to the fresh air dampers module 1706 as an input.

The phase shift PID controller 1708 is configured to receive the phase shift $\varphi_i$ from the CO2 PID controller 1712 as an input (e.g., minimum and maximum phase shift values, such as $\varphi_i=0.05\pi$ or $\varphi_i=0.95\pi$) to a PID control scheme to determine values of the amplitudes $A_0$ and $A_i$. The amplitude $A_0$ is provided to the fresh air dampers module 1706 as an input, according to some embodiments. The amplitude $A_i$ is provided to the zone damper modules 1704 as an input. The fresh air damper modules 1706 use the amplitude $A_0$ and the bias $b_0$ as inputs to determine the position of the damper of the AHU 620 as a function of time (e.g., using the amplitude $A_0$ and the bias $b_0$ as determined by the phase shift PID controller 1708 and the return CO2 PID controller 1710 as inputs to the function % $Open_{AHU}=A_0 \sin(wt)+b_0$). The zone damper modules 1704 use the phase shift $\varphi_i$, the amplitude $A_i$, and the bias $b_i$ as inputs to determine the position of the dampers of each of the VAV units 616 (e.g., for each of the zones) as a function of time (e.g., using the amplitude $A_i$, the phase shift $\varphi_i$, and the bias $b_i$ as determined by the phase shift PID controller 1708, the CO2 PID controller 1712, and the temperature PID controller 1714 as inputs to the function % $Open_{AHU}=A_i \sin(wt)+\varphi_i+b_i$). In some embodiments, the zone damper modules 1704 and the fresh air dampers module 1706 control the AHU 620 (e.g., the damper or vent thereof) and the VAV units 616 (e.g., the dampers thereof) using the damper positions over time as determined. In some embodiments, the phase shift PID controller 1708, the return CO2 PID controller 1710, the CO2 PID controller 1712, and the temperature PID controller 1714 are implemented on the controller 1102.

Figure 18:
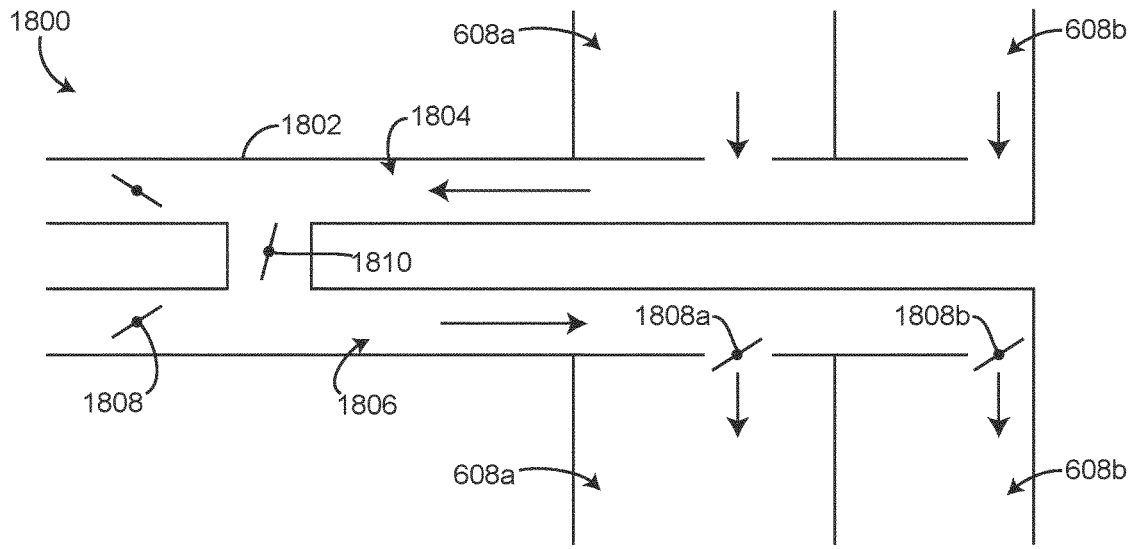
FIG. 18 is a diagram of a duct system for an AHU and VAV system that serves multiple zones, according to some embodiments.

Referring to FIG. 18, a diagram illustrates a duct system 1800 having ductwork 1802 that provide air to zones 608

(e.g., a first zone 608a and a second zone 608b) and receive return air from the zones 608, according to some embodiments. In some embodiments, the ductwork 1802 includes a supply duct 1806 that draws an amount of fresh or outdoor air due to operation of a damper 1808 (e.g., the damper of the AHU 620) and also draws an amount of recirculated air from a return duct 1804 due to operation of a damper 1810. In some embodiments, the dampers 1808 and 1810 are operated by the AHU 620 or a controller of the AHU 620 according to the control decisions determined by the controller 1102. In some embodiments, each of the zones 608 is served by a VAV unit (e.g., the VAV units 616) including dampers 1808. The damper 1808 can be adjusted (e.g., % $Open_{VAV}$) in order to provide an appropriate amount of air into the zones 608.

Figure 19:
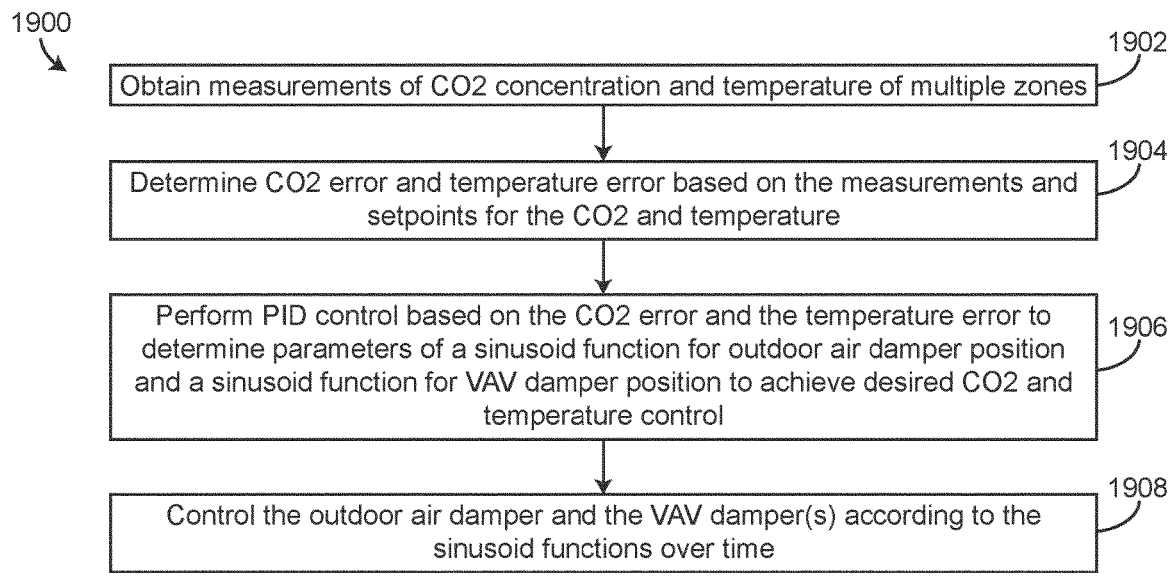
FIG. 19 is a flow diagram of a process for controlling a AHU and VAV system to continuously adjust damper positions to achieve desired temperature and CO2 control, according to some embodiments.

Referring to FIG. 19, a flow diagram of a process 1900 for controlling an outdoor air damper of an AHU and dampers of VAV units in a continuous manner to achieve desired temperature control and CO2 control includes steps 1902-1908, according to some embodiments. In some embodiments, the process 1900 is performed by the controller 1102 in order to achieve CO2 control and temperature control of multiple zones. In some embodiments, the process 1900 is performed to continuously adjust or control damper positions of the AHU 620 and the VAV units 616 according to sinusoidal functions.

The process 1900 includes obtaining measurements of CO2 concentrations and temperature of multiple zones (step 1902), according to some embodiments. In some embodiments, step 1902 is performed by the controller 1102 using measurements provided by the CO2 sensors 1120 and/or the temperature sensors 1118 that are positioned within the zones 608. In some embodiments, step 1902 includes obtaining real-time or current measurements in the zones 608.

The process 1900 includes determining a CO2 error and a temperature error based on the measurements and setpoints for the CO2 and the temperature (step 1904), according to some embodiments. In some embodiments, step 1904 is performed by the controller 1102, or more specifically by the CO2 controller 1114 of the controller 1102. In some embodiments, the temperature error and the CO2 error are determined based on predetermined desired or setpoint values, or based on values of the desired or setpoint values that are provided by a user as an input.

The process 1900 includes performing PID control based on the CO2 error and the temperature error to determine parameters of a sinusoid function for outdoor air damper position and a sinusoid function for VAV damper position to achieve desired CO2 and temperature control (step 1906), according to some embodiments. In some embodiments, step 1906 is performed by the controller 1102. In some embodiments, step 1906 is performed by the phase shift PID controller 1708, the return CO2 PID controller 1710, the CO2 PID controller 1712, and the temperature PID controller 1714. In some embodiments, the sinusoid functions each have parameters including amplitude, frequency, and bias. In some embodiments, the sinusoid function for the VAV damper position has a phase shift relative to the sinusoid function for the outdoor air damper position. In some embodiments, the bias of the sinusoid function for the VAV damper position is determined by performing PID control using the temperature error as an input. In some embodiments, the phase shift of the sinusoid function for the VAV damper position is determined by performing PID control using CO2 error as an input. In some embodiments, the bias of the sinusoid for the outdoor air damper position is determined by performing PID control using return CO2 error (e.g., a difference between CO2 concentration in return air from the zones and a desired value) or CO2 error. In some embodiments, the amplitudes of the sinusoid functions are determined by performing PID control using the phase shift or minimum and maximum values of the phase shift. In some embodiments, the frequencies are predetermined or tunable parameters.

The process 1900 includes controlling the outdoor air damper and the VAV dampers according to the sinusoid functions over time (step 1908), according to some embodiments. In some embodiments, step 1908 is performed by the controller 1102 or by low level controllers of the AHU 620 or the VAV units 614. In some embodiments, step 1908 includes providing time-series control signals to motors of the outdoor air damper and the VAV dampers that are generated using the sinusoid functions.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A ventilation and temperature control system of a building comprising:
   an air handling unit (AHU) configured to draw air from outside the building according to a fresh air intake fraction and recirculated air from a zone of the building;
   a variable air volume (VAV) unit configured to supply air to the zone of the building using air provided by the AHU; and
   processing circuitry configured to:
      obtain measurements of at least one of a carbon dioxide ($CO_2$) level or occupancy of the zone and a temperature of the zone;
      determine for a future time horizon, based on the temperature of the zone and at least one of the $CO_2$ level or the occupancy of the zone, a combination of (i) control decisions for the AHU comprising adjustments to the fresh air intake fraction between a plurality of values of the fresh air intake fraction for the future time horizon and (ii) control decisions for a damper of the VAV unit to satisfy both a ventilation control objective and a temperature control objective, the control decisions for the VAV unit comprising adjustments to a position of the damper of the VAV unit, wherein the control decisions for the damper of the VAV unit are determined using a predictive model of $CO_2$ of the zone, the predictive model configured to predict the $CO_2$ level of the zone as a function of the control decisions for the AHU and the control decisions for the VAV unit; and
      operate the AHU according to the control decisions for the AHU and operate the VAV unit according to the control decisions for the VAV unit.

2. The ventilation and temperature control system of claim 1, wherein the ventilation and temperature control system serves a plurality of zones, wherein the processing circuitry is configured to determine the control decisions for the AHU and the control decisions for a plurality of dampers of the VAV units to maintain the $CO_2$ levels of the plurality of zones below a $CO_2$ threshold and to maintain the temperatures of the plurality of zones within a range of a desired temperature as the ventilation control objective and the temperature control objective.

3. The ventilation and temperature control system of claim 1, wherein the control decisions for the AHU comprise a schedule for transitioning the fresh air intake fraction of the AHU between a plurality of discrete values for the future time horizon.

4. The ventilation and temperature control system of claim 1, wherein the control decisions for the damper of the VAV unit are further determined by the processing circuitry based on the measurement of the $CO_2$ level in the zone, and a threshold $CO_2$ level in the zone such that the control decisions for the damper of the VAV unit maintain the $CO_2$ level in the zone below the threshold $CO_2$ level.

5. The ventilation and temperature control system of claim 1, wherein determining, based on the $CO_2$ level of the zone and the temperature of the zone, control decisions for the AHU and control decisions for a damper of the VAV unit comprises:
   determining a $CO_2$ error based on the $CO_2$ level of the zone and a threshold $CO_2$ and a temperature error based on the temperature of the zone and a desired temperature;
   performing feedback control using the $CO_2$ error and the temperature error to determine a plurality of parameters including amplitude, bias, and frequency for a first sinusoid function indicative of positions of a damper of the AHU and a second sinusoid function indicative of positions of the damper of the VAV unit; and
   generating control decisions for the AHU according to outputs of the first sinusoid function, and generating control decisions for the damper of the VAV unit according to outputs of the second sinusoid function, wherein outputs of the first sinusoid function include a position of the damper of the AHU and outputs of the second sinusoid function include a position of the damper of the VAV unit.

6. The ventilation and temperature control system of claim 5, wherein the second sinusoid function comprises a phase shift relative to the first sinusoid function.

7. The ventilation and temperature control system of claim 1, wherein the processing circuitry is further configured to:
   store historical data for the $CO_2$ level of the zone and the control decisions for the AHU and the damper of the VAV unit; and
   adjust the predictive model of $CO_2$ of the zone, based on the historical data for the $CO_2$ level of the zone and the control decisions for the AHU and the damper of the VAV unit.

8. A controller for a ventilation and temperature control system of a building, the controller comprising:
   processing circuitry configured to:
      obtain measurements of at least one of a carbon dioxide ($CO_2$) level or occupancy of a zone and a temperature of the zone;
      determine for a future time horizon, based on the temperature of the zone and at least one of the $CO_2$ level or the occupancy of the zone, a combination of (i) control decisions for an air handling unit (AHU) comprising adjustments to a fresh air intake fraction of the AHU between a plurality of values of the fresh air intake fraction for the future time horizon and (ii) control decisions for a damper of a variable air volume (VAV) unit to satisfy both a ventilation control objective and a temperature control objective, the control decisions for the VAV unit comprising adjustments to a position of the damper of the VAV unit determined based on the adjustments to the fresh air intake fraction of the AHU for the future time horizon and a predictive model of $CO_2$ of the zone, the predictive model configured to predict the $CO_2$ level of the zone as a function of the control decisions for the AHU and the control decisions for the VAV unit; and
      operate the AHU according to the control decisions for the AHU and operate the VAV unit according to the control decisions for the VAV unit;
      wherein the AHU draws outdoor air and recirculated air according to the fresh air intake fraction and delivers air to the VAV unit through a duct.

9. The controller of claim 8, wherein the ventilation and temperature control system serves a plurality of zones, wherein the processing circuitry is configured to determine the control decisions for the AHU and the control decisions for a plurality of dampers of the VAV units to maintain the CO2 levels of the plurality of zones below a CO2 threshold and to maintain the temperatures of the plurality of zones within a range of a desired temperature as the ventilation control objective and the temperature control objective.

10. The controller of claim 8, wherein the control decisions for the AHU comprise a schedule for transitioning the fresh air intake fraction of the AHU between a plurality of discrete values for the future time horizon.

11. The controller of claim 8, wherein the control decisions for the damper of the VAV unit are further determined by the processing circuitry based on the measurement of the CO2 level in the zone, and a threshold CO2 level in the zone, such that the control decisions for the damper of the VAV unit maintain the CO2 level in the zone below the threshold CO2 level.

12. The controller of claim 8, wherein determining, based on the CO2 level of the zone and the temperature of the zone, control decisions for the AHU and control decisions for a damper of the VAV unit comprises:
   determining a CO2 error based on the CO2 level of the zone and a threshold CO2 and a temperature error based on the temperature of the zone and a desired temperature;
   performing feedback control using the CO2 error and the temperature error to determine a plurality of parameters including amplitude, bias, and frequency for a first sinusoid function indicative of positions of a damper of the AHU and a second sinusoid function indicative of positions of the damper of the VAV unit; and
   generating control decisions for the AHU according to outputs of the first sinusoid function, and generating control decisions for the damper of the VAV unit according to outputs of the second sinusoid function, wherein outputs of the first sinusoid function include a position of the damper of the AHU and outputs of the second sinusoid function include a position of the damper of the VAV unit.

13. The controller of claim 12, wherein the second sinusoid function comprises a phase shift relative to the first sinusoid function.

14. The controller of claim 8, wherein the processing circuitry is further configured to:
   store historical data for the CO2 level of the zone and the control decisions for the AHU and the damper of the VAV unit; and
   adjust the predictive model of CO2 of the zone, based on the historical data for the CO2 level of the zone and the control decisions for the AHU and the damper of the VAV unit.

15. A method for controlling a ventilation and temperature control system of a building, the method comprising:
   determining for a future time horizon, in response to measurements of a temperature of a zone and at least one of a carbon dioxide (CO2) level or occupancy of a zone a combination of (i) control decisions for an air handling unit (AHU) comprising adjustments to a fresh air intake fraction of the AHU between a plurality of values of the fresh air intake fraction for the future time horizon and (ii) control decisions for a damper of a variable air volume (VAV) unit to satisfy both a ventilation control objective and a temperature control objective, the control decisions for the VAV unit comprising adjustments to a position of the damper of the VAV unit for the future time horizon, wherein the control decisions for the damper of the VAV unit are determined using a predictive model of CO2 of the zone, the predictive model configured to predict the CO2 level of the zone as a function of the control decisions for the AHU and the control decisions for the VAV unit; and
   operating the AHU according to the control decisions for the AHU and operate the VAV unit according to the control decisions for the VAV unit;
   wherein the AHU draws outdoor air and recirculated air according to the fresh air intake fraction and delivers air to the VAV unit through a duct.

16. The method of claim 15, wherein the ventilation and temperature control system serves a plurality of zones, wherein method comprises determining the control decisions for the AHU and the control decisions for a plurality of dampers of the VAV units to maintain the CO2 levels of the plurality of zones below a CO2 threshold and to maintain the temperatures of the plurality of zones within a range of a desired temperature as the ventilation control objective and the temperature control objective.

17. The method of claim 15, wherein the control decisions for the AHU comprise a schedule for transitioning the fresh air intake fraction of the AHU between a plurality of discrete values for the future time horizon.

18. The method of claim 17, wherein the control decisions for the damper of the VAV unit are determined based on the schedule for transitioning the fresh air intake fraction of the AHU for the future time horizon, the measurement of the CO2 level in the zone, and a threshold CO2 level in the zone, such that the control decisions for the damper of the VAV unit maintain the CO2 level in the zone below the threshold CO2 level.

19. The method of claim 15, wherein determining, based on the CO2 level of the zone and the temperature of the zone, control decisions for the AHU and control decisions for a damper of the VAV unit comprises:
   determining a CO2 error based on the CO2 level of the zone and a threshold CO2 and a temperature error based on the temperature of the zone and a desired temperature;
   performing feedback control using the CO2 error and the temperature error to determine a plurality of parameters including amplitude, bias, and frequency for a first sinusoid function indicative of positions of a damper of the AHU and a second sinusoid function indicative of positions of the damper of the VAV unit; and
   generating control decisions for the AHU according to outputs of the first sinusoid function, and generating control decisions for the damper of the VAV unit according to outputs of the second sinusoid function, wherein outputs of the first sinusoid function include a position of the damper of the AHU and outputs of the second sinusoid function include a position of the damper of the VAV unit;
   wherein the second sinusoid function comprises a phase shift relative to the first sinusoid function.

20. The method of claim 15, further comprising:
   storing historical data for the CO2 level of the zone and the control decisions for the AHU and the damper of the VAV unit; and
   adjusting the predictive model of CO2 of the zone, based on the historical data for the CO2 level of the zone and the control decisions for the AHU and the damper of the VAV unit.

* * * * *